(12) United States Patent
Maeda et al.

(10) Patent No.: US 8,977,802 B2
(45) Date of Patent: Mar. 10, 2015

(54) ACCESS DEVICE, INFORMATION RECORDING DEVICE, CONTROLLER, REAL TIME INFORMATION RECORDING SYSTEM, ACCESS METHOD, AND PROGRAM

(75) Inventors: Takuji Maeda, Osaka (JP); Masayuki Toyama, Osaka (JP); Hirokazu So, Kyoto (JP); Yoshinori Nakashima, Osaka (JP); Katsumi Watanabe, Osaka (JP); Masafumi Nosaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 682 days.

(21) Appl. No.: 13/254,911

(22) PCT Filed: Oct. 19, 2010

(86) PCT No.: PCT/JP2010/006192
§ 371 (c)(1),
(2), (4) Date: Sep. 6, 2011

(87) PCT Pub. No.: WO2011/058700
PCT Pub. Date: May 19, 2011

(65) Prior Publication Data
US 2011/0320692 A1 Dec. 29, 2011

(30) Foreign Application Priority Data
Nov. 11, 2009 (JP) ................. 2009-257856

(51) Int. Cl.
*G06F 12/00* (2006.01)
*G06F 3/06* (2006.01)
(Continued)

(52) U.S. Cl.
CPC ............ *G06F 3/0643* (2013.01); *G06F 3/0613* (2013.01); *G06F 3/0674* (2013.01); *H04N 21/42661* (2013.01); *H04N 21/4334* (2013.01)
USPC .......................................... 711/103; 711/154

(58) Field of Classification Search
USPC ................................................. 711/103, 154
See application file for complete search history.

(56) References Cited

U.S. PATENT DOCUMENTS 5,579,502 A 11/1996 Konishi et al.
6,212,097 B1 4/2001 Kihara et al.
(Continued)

FOREIGN PATENT DOCUMENTS

JP 05-046459 A 2/1993
JP 06-266587 A 9/1994
(Continued)

OTHER PUBLICATIONS

Japanese Office Action for corresponding Japanese Application No. 2011-540396.
(Continued)

*Primary Examiner* — Matthew Bradley
(74) *Attorney, Agent, or Firm* — Renner, Otto, Boisselle & Sklar, LLP

(57) ABSTRACT

Provided is a method for stabilizing and increasing the speed of processing for writing a plurality of different-sized files such as a video file and a management file in parallel in the case where the area in a non-volatile memory of an information recording module is managed by a file system. An access module (1) includes a means for retaining sequential areas in logical block units as areas for writing file data, and a means for realizing file data addition and overwriting by writing data to logical blocks and changing links in a FAT regardless of whether file data addition or overwriting is performed. Writing to the information recording module is performed by writing to sequential addresses in the logical blocks. This realizes the stabilization of and an increase in the file data recording speed by suppressing needless copy processing performed in the information recording module 2 in the case of recording a plurality of files such as a video file and a management file in parallel.

17 Claims, 19 Drawing Sheets

(51) Int. Cl.
*H04N 21/426* (2011.01)
*H04N 21/433* (2011.01)

(56) References Cited

U.S. PATENT DOCUMENTS

| | | | |
|---|---|---|---|
| 7,353,324 B2 | 4/2008 | Tanaka |
| 7,958,287 B2 | 6/2011 | Tanaka |
| 7,958,288 B2 | 6/2011 | Tanaka |
| 8,065,473 B2 | 11/2011 | Ito et al. |
| 8,180,956 B2 | 5/2012 | Ito et al. |
| 8,209,467 B2 | 6/2012 | Ito et al. |
| 2004/0210708 A1 | 10/2004 | Conley |
| 2005/0068802 A1 | 3/2005 | Tanaka |
| 2005/0069292 A1 | 3/2005 | Yokota et al. |
| 2007/0033364 A1 | 2/2007 | Maeda et al. |
| 2007/0043924 A1 | 2/2007 | Ito et al. |
| 2007/0162707 A1 | 7/2007 | So et al. |
| 2008/0172427 A1 | 7/2008 | Ito |
| 2008/0189472 A1 | 8/2008 | Tanaka |
| 2008/0215803 A1 | 9/2008 | Tanaka |
| 2009/0198889 A1 | 8/2009 | Ito et al. |
| 2010/0228905 A1 | 9/2010 | Honda |
| 2010/0250839 A1 | 9/2010 | Ito et al. |
| 2010/0332717 A1 | 12/2010 | Maeda et al. |
| 2011/0022645 A1 | 1/2011 | Maeda et al. |
| 2011/0060871 A1 | 3/2011 | Tanaka |
| 2011/0060872 A1 | 3/2011 | Tanaka |
| 2011/0060873 A1 | 3/2011 | Tanaka |
| 2011/0060874 A1 | 3/2011 | Tanaka |
| 2012/0036313 A1 | 2/2012 | Ito et al. |

FOREIGN PATENT DOCUMENTS

| | | |
|---|---|---|
| JP | 2001-202282 A | 7/2001 |
| JP | 2006-164017 | 6/2006 |
| JP | 2007-012124 A | 1/2007 |
| JP | 2008-003932 A | 1/2008 |
| JP | 2008-226254 A | 9/2008 |
| JP | 2005-108304 A | 4/2009 |
| JP | 2009-134513 A | 6/2009 |
| JP | 2009-187184 A | 8/2009 |
| JP | 2009-199625 A | 9/2009 |
| JP | 2009-205590 A | 9/2009 |
| JP | 2009-205591 A | 9/2009 |
| JP | 2009-231900 A | 10/2009 |
| WO | 2005/043394 A1 | 5/2005 |
| WO | 2005/055064 A1 | 6/2005 |
| WO | 2009/013877 A1 | 1/2009 |
| WO | 2009/107393 A1 | 9/2009 |
| WO | 2009/122743 A1 | 10/2009 |

OTHER PUBLICATIONS

Amagai et al., "The Design and Implementation of 'nilfs', a Log-Structured File System for Linux", IPSJ SIG Technical Reports, May 26, 2005, pp. 61-68, vol. 2005, No. 48, Japan, with partial English Translation.

Office Action for corresponding Japanese Application JP2011-540396, mailed Oct. 22, 2013.

Japanese Office Action for corresponding Japanese Application No. 2011-540396 issued on Apr. 16, 2013.

International Search Report for corresponding International Application No. PCT/JP2010/006192 mailed Nov. 22, 2010.

ACCESS DEVICE, INFORMATION RECORDING DEVICE, CONTROLLER, REAL TIME INFORMATION RECORDING SYSTEM, ACCESS METHOD, AND PROGRAM

TECHNICAL FIELD

The present invention relates to an access module, an information recording module, a controller, a real-time information recording system, an access method, and a program for storing data on a non-volatile memory and managing data as files.

BACKGROUND ART

There are various types of recording media for recording digital data such as music content and video data, examples of which include a magnetic disk, an optical disc, and a magneto-optical disk. Among such recording media, memory cards that use a semiconductor memory such as a flash ROM as the recording element have rapidly become prevalent particularly in compact mobile devices such as digital still cameras and mobile phone terminals, due to the ability of the recording medium to be reduced in size. Moreover, in addition to applications as removable media as with conventional memory cards, semiconductor memory has recently been used in applications as internal device storage, such as incorporating a semiconductor memory such as a flash ROM into a device for use in place of a hard disk.

Mainly a semiconductor element called a NAND-type flash memory is used in such memory cards and internal device storage. A NAND-type flash memory is a recording element that, after previously recorded data has been erased once, can again record different data, and likewise to conventional hard disks, an information recording device in which rewriting can be performed multiple times can be configured by using a NAND-type flash memory.

Conventionally, data stored on a memory card or in internal device storage is managed using a file system. Managing data using a file system enables data to be shared as a file among devices that can interpret the same file system, and enables data stored by a user to be easily referenced from and copied among multiple devices by the user.

Conventionally, the most widely-used file system has been the so-called FAT file system. The FAT file system is widely used as the file system in floppy disks, PC hard disks, memory cards, and the like due to having the characteristic that area management is performed in a unified manner by a table called a file allocation table (FAT), as well as having a relatively simple structure and being easily implemented.

FIG. 2 shows a configuration of the FAT file system.

Although there are various types of FAT file systems, such as FAT12, FAT16, and FAT32, which differ in the bit width of the unit of management in the file allocation table, the method of area management using a file allocation table is substantially the same. The following describes FAT16 as an example.

As shown in FIG. 2, a file system management information area 301 is located at the head of a logical address space, and is an area in which file system management information is stored, which is information such as the unit in which area is allocated and the size of the area managed by the file system. This file system management information area 301 includes file system management information called a master boot record (MBR) partition table 303, a partition boot sector (PBS) 304, FATs (305 and 306), and a root directory entry (RDE) 307, each of which stores information necessary for managing a user data area 302. The master boot record partition table 303 is an area for storing information for managing the area in the logical address space managed by the file system, by dividing the area into a plurality of areas called partitions. The partition boot sector 304 is an area for storing information regarding management in a partition, such as the size of the unit of area management in the partition. The FATs (305 and 306) are areas for storing information related to the storage locations of data contained in files, and normally there are two FATs (305 and 306) that hold the same information, thus providing duplication such that even if one of the FATs (305 or 306) is damaged, files can be accessed using the other FAT (305 or 306). The root directory entry 307 is an area for storing information (directory entries) regarding files and directories that exist directly under the root directory.

Also, in the FAT file system, the user data area 302 for storing the data of actual files and the like follows the file system management information area 301. The user data area 302 is divided into and managed in management units called clusters that have a size of approximately 512 bytes to 32 KB, and data included in files is stored in the clusters. When a file stores a large amount of data, the data is stored spanning multiple clusters, and the connection between the clusters is managed by link information stored in the FATs (305 and 306). Also, information (directory entries) related to the files and subdirectories located in a directory immediately under the root directory is stored using a portion of the user data area 302.

FIG. 3 is a diagram showing a configuration of a FAT16 directory entry.

One 32-byte directory entry 308 is allocated for each file and directory, and stores information related to the file or directory. Specifically, each time a file or directory is added, information for a new 32-byte directory entry 308 is created and recorded in an area of the root directory entry 307 or in the user data area 302. The name of the file or directory is stored in the first eight bytes of the directory entry 308. The extension is stored in the next three bytes. The next one byte stores attribute information such as a flag identifying the type of file or directory, and a flag identifying whether the file or directory is read-only. The directory entry 308 also stores, for example, information indicating the last-updated date/time of the file or directory, a starting cluster number indicating the start location of the clusters storing the actual file or directory, and the file size in number of bytes. Such a directory entry 308 only holds information related to the location of the cluster holding data at the head of the file, and therefore in the case where file data is stored spanning multiple clusters, the location information of the clusters is held in the FATs (305 and 306). In other words, in the case of updating a file, in addition to writing the file data, it is necessary to write information in the directory entry 308 and the FATs (305 and 306) as well.

<<File Data Writing Processing FAT File System>>

Next is a description of a procedure of file data writing processing in the FAT file system with reference to FIG. 4.

(S401):
In S401, the directory entry 308 of the target file is read out.
(S402):
In S402, the starting cluster number stored in the directory entry 308 that was read out is acquired, and the head location of the file data is checked.
(S403):
In S403, the FAT (305 or 306) is read out to a RAM of an access module, and the cluster number of the writing location is acquired by following the links in the FAT (305 or 306) in the RAM from the head location of the file data acquired in S402.

(S404):

In S404, a determination is made as to whether a new free area needs to be allocated to the file when writing file data. If the result of the determination is that a free area needs to be allocated, the procedure moves to the processing of S405. On the other hand, if a free area does not need to be allocated, the procedure moves to the processing of S408.

(S405):

In S405, one cluster-worth of free area is acquired by searching for a free area in the FAT (305 or 306) in the RAM. Since a value of 0x0000 set in a FAT entry in the FATs (305 and 306) represents that the FAT entry is a free cluster, the processing for acquiring a free area is processing for acquiring a FAT entry having the value 0x0000 in the FAT (305 or 306). Specifically, the FAT entries in the FAT (305 or 306) in the RAM are sequentially referenced, a FAT entry in which the value 0x0000 is set is found, and the value of the cluster number corresponding to that FAT entry is obtained. The processing for searching for a FAT entry may be implemented by, for example, searching for a FAT entry in order from the head of the FAT (305 or 306) to the end thereof. Alternatively, the processing for searching for a FAT entry may be executed by starting the search processing at the FAT entry following the FAT entry to which a free area was previously allocated, and if the end of the FAT (305 or 306) is reached, returning to the head of the FAT (305 or 306) and continuing the search up to the FAT entry to which a free area was previously allocated. In this way, there is no limitation on the procedure of FAT entry search processing, as long as it is possible to realize processing for searching the entirety of the FAT (305 or 306) area for a free area.

(S406):

In S406, the value of the FAT entry corresponding to the free cluster number acquired in S405 is set to a value indicating the link tail. Since a value of 0xFFFF set in a FAT entry in the FAT (305 or 306) represents that the FAT entry is the link tail, processing for setting the value of the corresponding FAT entry to 0xFFFF in the RAM is implemented in S406.

(S407):

In S407, the value of the FAT entry corresponding to the cluster number of the current link tail is changed in the RAM from 0xFFFF to the number of the free cluster acquired in S405. If a free area needs to be acquired (the determination result of S404 is "Yes"), an addition is made to the end of the file. In other words, in this case, the links have been followed to the end of the file in the processing for following links in S403, and therefore the value of the FAT entry corresponding to the cluster number of the current link tail has been set to 0xFFFF, which represents the link tail. For this reason, in the processing of S407, a link is connected to the new free cluster that was acquired in S405, and therefore the file links become one cluster-worth longer, and file data can be added.

(S408):

In S408, file data is written to the cluster at the currently referenced writing location. If it was determined in S404 that a free area needs to be acquired, the currently referenced writing location is the free cluster acquired in S405. On the other hand, if it was determined in S404 that a free area does not need to be acquired, the currently referenced writing location is the cluster arrived at as a result of following the links in S403.

(S409):

In S409, a determination is made as to whether the writing of all of the file data has been completed. If any file data remains, the procedure returns to the processing of S404. If the writing of all of the file data has been completed, the procedure proceeds to the processing of S410.

(S410):

Information such as the file size and last updated date/time stored in the directory entry 308 are updated, and the directory entry 308 stored in a non-volatile memory of an information recording module is overwritten.

(S411):

In S411, the FATs (305 and 306) stored in the non-volatile memory of the information recording module are overwritten with the data of the FAT (305 or 306) in the RAM of the access module, thereby completing the processing.

According to the file data writing processing described above, in the case of adding 10,000 bytes of data to FILE1.TXT, which is shown in FIG. 5 and has 60,000 bytes of data, this file (FILE1.TXT) changes to a file having 70,000 bytes of data as shown in FIG. 6. Specifically, the cluster with the cluster number 6 is acquired as a free cluster, file data is added to the acquired cluster, and a link connecting to the cluster number 6 is written to the FAT (305 or 306). As a result, the links of the file FILE1.TXT are updated from being made up of the four clusters with the cluster numbers 2 to 5, to being made up of the five clusters with the cluster numbers 2 to 6. In this way, in the FAT file system, since file management information is stored in both the FATs (305 and 306) and the directory entry 308, such information (information in the FATs (305 and 306) and information in the directory entry 308) also needs to be updated when updating a file.

Incidentally, NAND-type flash memory has the characteristic that data needs to be erased once before data is recorded. In the case of writing data whose size is less than the size of a block, which is the unit of data erasure, to a NAND-type flash memory, the corresponding block cannot be directly overwritten, and therefore it is necessary to acquire a different unused block, erase the data in the acquired block, and write the new data to the block whose data was erased. At this time, the valid data contained in the old block needs to copied to the new block, thus reducing the speed at which data is recorded. The amount of copying performed when recording this data increases the smaller the size of the data to be written is, and decreases the closer the size of the data to be written is to the block size. For this reason, it is known that the data recording speed is generally faster when data is written to a NAND-type flash memory in units of the block size.

Conventionally, a method has been proposed that realizes real-time recording (data writing processing in which a certain writing speed is guaranteed) of video content and the like by increasing the speed of recording to a NAND-type flash memory and preventing a decrease in the data recording speed due to the above-described copy processing (e.g., see Patent Literature 1). With this method (the method disclosed in Patent Literature 1), if the area in the flash memory is divided into block units, only a block that contains a large number of free areas (free clusters) is acquired, and data such as video content is recorded to the acquired block. Doing this reduces the amount of data copying in a block, thus preventing a decrease in the recording speed.

Also, in the case where the access module updates a file stored in the information recording module, with the FAT file system, it is necessary to update file system management information in the FATs (305 and 306), the directory entry 308, and the like, in addition to recording the actual data, as described with reference to FIG. 4. Conventionally, a method has been proposed that increases the speed of updating such file system management information in a NAND-type flash memory (e.g., see Patent Literature 2). With this method (the method disclosed in Patent Literature 2), in the case of recording user data and file system management information, the access device notifies the recording medium of the data type, thus enabling the recording medium to implement storage methods that are in accordance with the characteristics of the respective data, and perform high-speed recording even when recording a combination of high-volume data such as user data and low-volume data such as file system management information.

CITATION LIST

Patent Literature

Patent Literature 1: WO 2005/055064
Patent Literature 2: WO 2005/043394

SUMMARY

Technical Problem

According to the conventional methods, it is possible to realize high-speed recording of user data such as a video file and file system management information in the FATs (305 and 306), the directory entry 308, and the like. However, when capturing a video with a video capturing device such as a camcorder, there are cases where not only a video file is recorded, but also multiple management files are recorded at the same time, examples of which include a file storing playlist information, and a file storing playback time information at an arbitrary data location in the video file. In other words, in order to perform real-time video recording in a device such as a camcorder, consideration needs to be given to the recording of such management files as well. Generally, a video file is a large file whose size is several MB to several GB, whereas a management file is a small file whose size is approximately several bytes to several tens of KB. With a NAND-type flash memory, due to have the aforementioned characteristics, the recording speed decreases in processing for recording a management file whose amount of data is less than or equal to the block size. Furthermore, in addition to management files that are added during video recording, there are also management files that are overwritten. In particular, in the case where file overwrite processing is to be executed, data is repeatedly written to the same logical address in the NAND-type flash memory, and therefore copying processing is performed in the NAND-type flash memory each time, thus reducing the recording speed.

The present invention has been achieved in view of the aforementioned issues, and an object thereof is to provide an access module, an information recording module, a controller, a real-time information recording system, an access method, and a program for realizing real-time recording (data writing processing in which a certain writing speed is guaranteed) by preventing a decrease in recording speed even in the case of recording a plurality of different-sized files such as a video file and a management file to a NAND-type flash memory in parallel.

Solution to Problem

A first aspect of the invention is an access device that accesses an information recording device including a non-volatile memory for storing data, the access device including a storage address determination processing unit, a link move processing unit, and an information storage module access unit.

The storage address determination processing unit manages a data storage area in the information recording device by dividing the data storage area in block units having a predetermined block size, and sets a first storage block for storing data of a first file and a second storage block for storing data of a second file that manages the first file. Also, the storage address determination processing unit determines an address for recording the first file data in order in the first storage block, in ascending order from a first address in the first storage block. Also, in a case where the second file data corresponding to the first file data recorded in the first storage block is to be updated or added, the storage address determination processing unit determines an address for recording cluster data to an unused cluster area having a lowest address in the second storage block, the cluster data corresponding to an update portion or an addition portion of the second file data.

The link move processing unit updates inter-cluster link information related to the second file data based on the data update or the data addition in the second storage block.

An information storage module access unit instructs the information recording device to record the first file data and the second file data in accordance with the storage address processing unit and the link move processing unit.

According to this access device, different blocks (a first storage block and a second storage block) are allocated to a first file and a second file respectively, and regardless of whether processing for addition (data addition processing) or overwriting (data overwrite processing) is to be executed, (1) in the case where the first file is the writing target, the first file data is always written sequentially in order from the head of the block, and (2) in the case where the second file is the writing target, the second file data is written in order from the unused cluster area having the lowest address in the second storage block (the address closest to the head in the second storage block). Accordingly, using this access device always guarantees that data is sequentially recorded to the information recording device. As a result, a real-time information recording system using this access device and information recording device enables an increase in the speed of data recording.

Note that "access device" is a concept including an access module.

A second aspect of the invention is the first aspect of the invention, wherein regardless of whether processing for writing data to the information recording device is processing for adding data to the first file or processing for overwriting data of the first file, the storage address determination processing unit may set, as a start location for writing of the first file data, a next address after a last writing location in a case where writing was performed in units whose length is a multiple of a predetermined writing size in order from a head of the first storage block. Also, regardless of whether processing for writing data to the information recording device is processing for adding data to the second file or processing for overwriting data of the second file, the storage address determination processing unit may set, as a start location for writing of the second file data, a next address after a last writing location in a case where writing was performed in units whose length is a multiple of the predetermined writing size in order from a head of the second storage block.

According to this access device, regardless of whether data addition processing/data overwrite processing is to be performed on the first file or data addition processing/data overwrite processing is to be performed on the second file, the storage address determination processing unit sets, as the writing start location, the next address after the last writing location in the case where writing was performed in units whose length is a multiple of the predetermined writing size in order from the head of the storage block. For this reason, this access device always ensures that data is written in units whose length is a multiple of the predetermined writing size. For example, in the case where the predetermined writing size and the cluster size match each other, according to this access device, data writing processing is executed from the first address of a cluster (free cluster), regardless of whether data addition processing/data overwrite processing is to be performed on the first file or data addition processing/data overwrite processing is to be performed on the second file. Accordingly, the occurrence of so-called saving process (aggregation process) can be suppressed, and as a result, a real-time information recording system using this access device and information recording device enables an increase in the speed of data recording.

A third aspect of the invention is the first or second aspect of the invention, wherein the information storage module access unit may instruct the information recording device to record inter-cluster link information related to file data in the first storage block and/or the second storage block.

A fourth aspect of the invention is any of the first to third aspects of the invention, wherein a file system control unit may be further included.

The file system control unit may, in a case where writing of data whose size is less than the predetermined writing size is to be performed, perform control such that data whose length is a multiple of the predetermined writing size is generated by reading out data included in the same predetermined writing size unit and combining the readout data with new data that is to be written, and thereafter the generated data is written to the information recording device.

Accordingly, even in the case where writing of data whose size is less than the predetermined writing size is to be performed, processing for writing data whose length is a multiple of the predetermined writing size is guaranteed.

A fifth aspect of the invention is any of the first to fourth aspects of the invention, wherein the first file may be a file storing actual content, and the second file may be a file storing supplementary information of content.

A sixth aspect of the invention is any of the first to fifth aspects of the invention, wherein the predetermined writing size may be a multiple of the size of a physical data recording processing unit of the non-volatile memory included in the information recording device.

A seventh aspect of the invention is any of the first to sixth aspects of the invention, wherein the predetermined block size may be a multiple of the size of a physical data erasure processing unit of the non-volatile memory included in the information recording device.

An eighth aspect of the invention is an information recording device that is capable of being connected to an access device so as to be able to communicate with the access device, and writes and/or reads out data in accordance with an instruction from the access device, the information recording device including a non-volatile memory and a recording block management control unit.

The non-volatile memory is for storing data.

The recording block management control unit sets a first temporary block area and a second temporary block area in the non-volatile memory. Also, in a case where, based on address management information storing information indicating a location that is designated by the access device and is in a first storage block for storing data of a first file and information indicating a location that is designated by the access device and is in a second storage block for storing data of a second file, the fact that data is to be recorded in the first storage block has been recognized, the recording block management control unit performs control such that the data is stored in the first temporary block area in the non-volatile memory. Also, the recording block management control unit performs control such that, in a case where the fact that data is to be recorded in the second storage block has been recognized based on the address management information, the data is stored in the second temporary block area in the non-volatile memory.

According to this information recording device, the recording block management control unit performs control such that, in the case where the fact that data is to be recorded in the first storage block has been recognized based on the address management information, the data is stored in the first temporary block area in the non-volatile memory, and performs control such that, in the case where the fact that data is to be recorded in the second storage block has been recognized based on the address management information, the data is stored in the second temporary block area in the non-volatile memory. Accordingly, by being controlled by the access device of the first aspect of the invention, for example, this information recording device enables always guaranteeing sequential recording using the first file temporary block (cache block) and the second file temporary block (cache block). As a result, a real-time information recording system using this access device and information recording device enables an increase in the speed of data recording.

Note that "information recording device" is a concept including an information recording module.

A ninth aspect of the invention is the eighth aspect of the invention, wherein the recording block management control unit may set the address management information based on the information indicating a location in the first storage block and/or the second storage block that is notified in advance by the access device prior to data recording.

A tenth aspect of the invention is the eighth or ninth aspect of the invention, wherein the recording block management control unit may acquire an arbitrary free block based on notification of the information indicating a location in the first storage block and/or the second storage block by the access device, and allocate the acquired free block to the first temporary block area and/or the second temporary block area.

An eleventh aspect of the invention is a controller that controls an information recording device including a non-volatile memory for storing data, the controller including a recording block management control unit.

The recording block management control unit sets a first temporary block area and a second temporary block area in the non-volatile memory. Also, the recording block management control unit references address management information storing information indicating a location that is designated by an external access device and is in a first storage block for storing data of a first file and information indicating a location that is designated by the access device and is in a second storage block for storing data of a second file, performs control such that, in a case where the fact that data is to be recorded in the first storage block has been recognized, the data is stored in the first temporary block area in the non-volatile memory, and performs control such that, in a case where the fact that data is to be recorded in the second storage block has been recognized, the data is stored in the second temporary block area in the non-volatile memory.

A twelfth aspect of the invention is a real-time information recording system including the access device according to any of the first to seventh aspects of the invention and the information recording device according to any of the eighth to tenth aspects of the invention.

According to this real-time information recording system, different blocks (a first storage block and a second storage block) are allocated to a first file and a second file respectively, and regardless of whether processing for addition (data addition processing) or overwriting (data overwrite processing) is to be executed, data is always sequentially written in order from the head of the block. Accordingly, with this real-time information recording system, the sequential recording of data to the information recording device is always guaranteed. As a result, this real-time information recording system enables an increase in the speed of data recording.

A thirteenth aspect of the invention is a memory access method for use in an access device that accesses an information recording device including a non-volatile memory for storing data, the memory access method including a storage address determination processing step, a link move processing step, and an information storage module access step.

The storage address determination processing step is a step of managing a data storage area in the information recording device by dividing the data storage area in block units having a predetermined block size, and setting a first storage block for storing data of a first file and a second storage block for storing data of a second file that manages the first file. Also, the storage address determination processing step is a step of determining an address for recording the first file data in order in the first storage block, in ascending order from a first address in the first storage block. Also, the storage address determination processing step is a step of, in a case where the second file data corresponding to the first file data recorded in the first storage block is to be updated or added, determining an address for recording cluster data to an unused cluster area having a lowest address in the second storage block, the cluster data corresponding to an update portion or an addition portion of the second file data.

The link move processing step is a step of updating inter-cluster link information related to the second file data based on the data update or the data addition in the second storage block.

An information storage module access step is a step of instructing the information recording device to record the first file data and the second file data in accordance with a result of processing in the storage address processing step and the link move processing step.

Accordingly, it is possible to realize an access method having effects similar to those of the first aspect of the invention.

A fourteenth aspect of the invention is a program for causing a computer to execute a memory access method for use in an access device that accesses an information recording device including a non-volatile memory for storing data. The access method includes a storage address determination processing step and a link move processing step.

The storage address determination processing step is a step of managing a data storage area in the information recording device by dividing the data storage area in block units having a predetermined block size, and setting a first storage block for storing data of a first file and a second storage block for storing data of a second file that manages the first file. Also, the storage address determination processing step is a step of determining an address for recording the first file data in order in the first storage block, in ascending order from a first address in the first storage block. Also, the storage address determination processing step is a step of, in a case where the second file data corresponding to the first file data recorded in the first storage block is to be updated or added, determining an address for recording cluster data to an unused cluster area having a lowest address in the second storage block, the cluster data corresponding to an update portion or an addition portion of the second file data.

The link move processing step is a step of updating inter-cluster link information related to the second file data based on the data update or the data addition in the second storage block.

An information storage module access step is a step of instructing the information recording device to record the first file data and the second file data in accordance with a result of processing in the storage address processing step and the link move processing step.

Accordingly, it is possible to realize a program for causing a computer to execute an access method having effects similar to those of the first aspect of the invention.

Advantageous Effects

According to the present invention, it is possible to realize an access module, an information recording module, a controller, a real-time information recording system, an access method, and a program for realizing real-time recording (data writing processing in which a certain writing speed is guaranteed) by preventing a decrease in recording speed even in the case of recording a plurality of different-sized files such as a video file and a management file to a NAND-type flash memory in parallel.

DESCRIPTION OF EMBODIMENTS

Below is a description of a real-time information recording system of the present invention, and an access module (access device), information recording module (information recording device), and a controller constituting the real-time information recording system, with reference to the drawings.

Embodiment 1

<1.1: Configuration of Real-Time Information Recording System>

Figure 1:
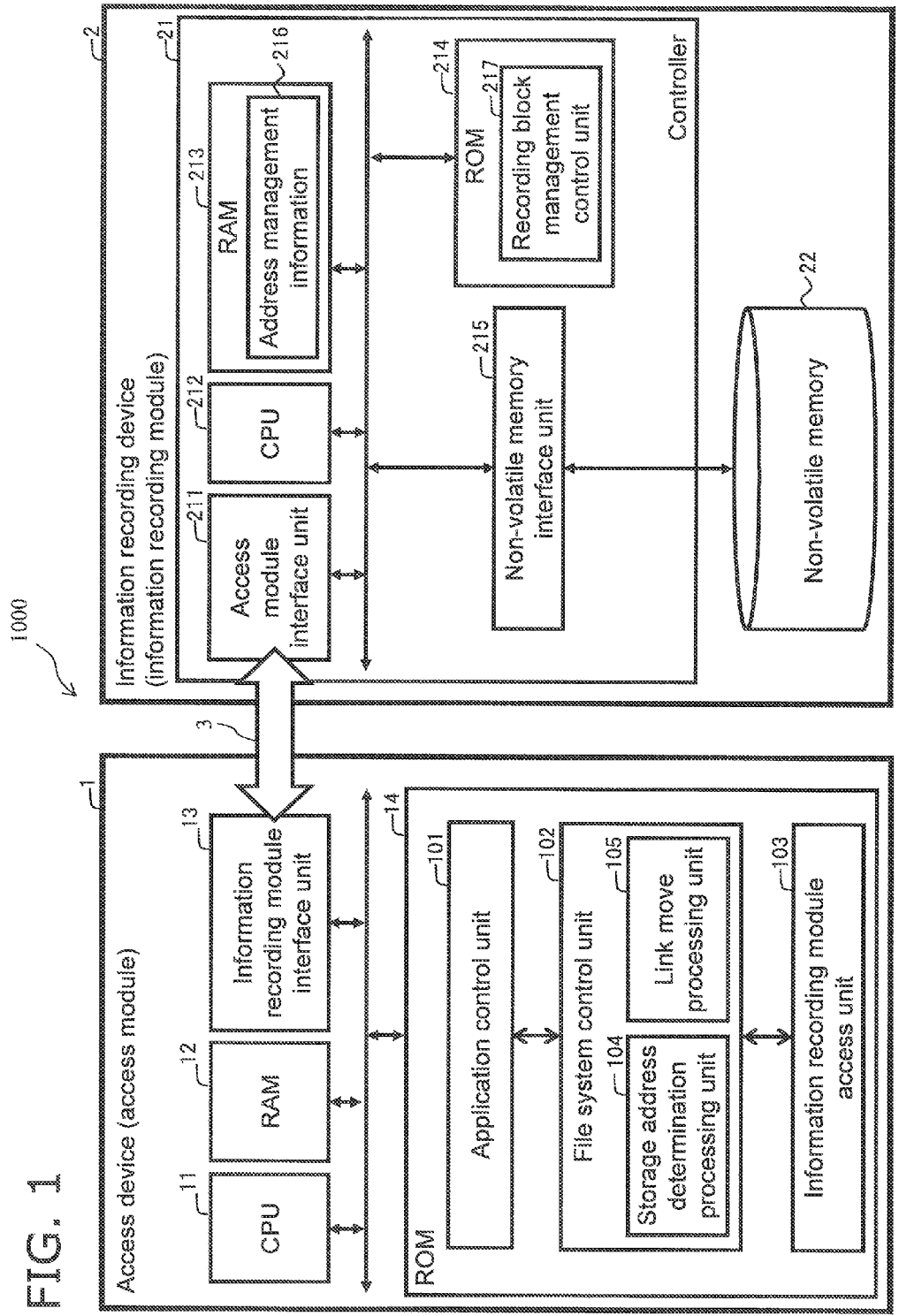
FIG. 1 is an illustrative diagram showing a configuration of an access module and an information recording module according to Embodiment 1.
Figure 2:
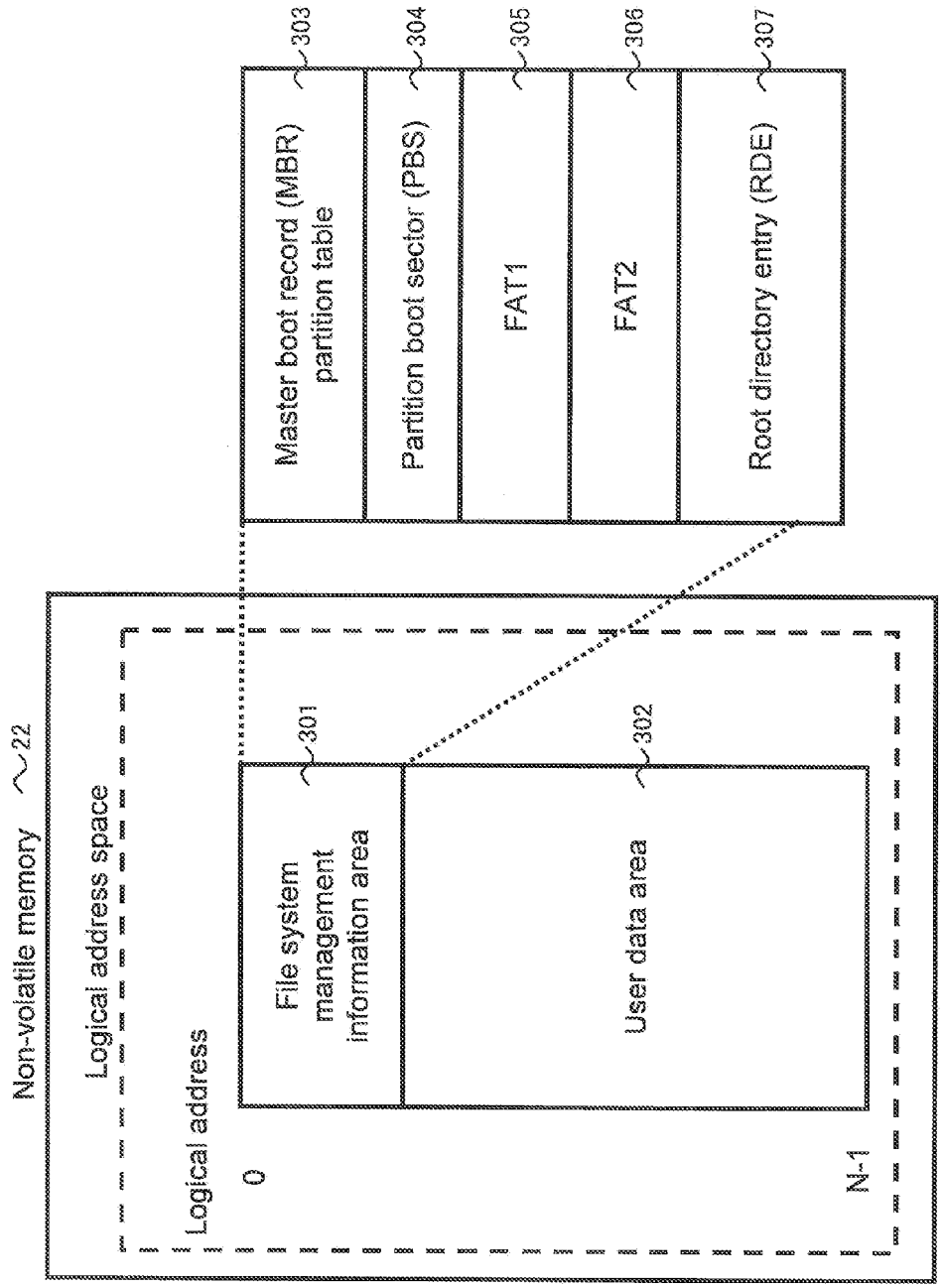
FIG. 2 is an illustrative diagram showing a configuration of a FAT file system.

FIG. 1 is a diagram showing a schematic configuration of a real-time information recording system 1000 according to Embodiment 1. As shown in FIG. 1, the real-time information recording system 1000 includes an access module (access device) 1 and an information recording module (information recording device) 2, and the access module 1 and the information recording module 2 are connected by a bus 3 and can communicate with each other bidirectionally.

Note that constituent elements not related to the present invention are not shown in the drawings used in the following description. Also, the present invention is needless to say not limited to the embodiments described below.

(1.1.1: Access Module)

As shown in FIG. 1, the access module (access device) 1 includes a CPU 11, a RAM 12, an information recording module interface unit 13, and a ROM 14. Note that the function units of the access module 1 may be connected by an internal bus as shown in FIG. 1, or all or some of the function units may be directly connected to each other.

The ROM 14 stores a program for controlling the access module 1, and this program uses the RAM 12 as a temporary storage area and runs on the CPU 11.

The information recording module interface unit 13 is a connection unit that connects the information recording module 2 and the access module 1, and exchanges control signals and data with the information recording module 2 via the bus 3.

The ROM 14 includes an application control unit 101, a file system control unit 102, and an information recording module access unit 103.

Note that although it is assumed in the present embodiment that the function units in the ROM 14 (the application control unit 101, the file system control unit 102, and the information recording module access unit 103) are realized by software in the ROM 14, there is no limitation to this, and all or some of the function units may be realized by hardware.

The application control unit 101 performs overall control of the access module 1, such as data generation and power control.

The file system control unit 102 performs control for managing data as files using a file system such as a FAT file system. Also, the file system control unit 102 includes a storage address determination processing unit 104 and a link move processing unit 105.

The storage address determination processing unit 104 is a processing unit that determines a storage destination logical address for file data when data is to be recorded in a file, and does not exist in conventional access modules.

Also, the link move processing unit 105 is a processing unit that causes recording to the information recording module 2 to be sequential recording to sequential logical addresses by changing links between clusters in a FAT (305 or 306) when addition processing or overwrite processing has been performed with respect to a management file. The link move processing unit 105 and the storage address determination processing unit 104 likewise do not exist in conventional access modules.

Details of these processing units will be described later.

The information recording module access unit 103 receives data along with the size of the data and the address to which the data is to be written (recorded) from the file system control unit 102, and generates a command and data for, for example, recording data having a designated size to a designated location in a non-volatile memory 22 of the information recording module 2. The information recording module access unit 103 then performs control such that the generated command and data are exchanged with the information recording module 2 via the information recording module interface unit 13.

(1.1.2: Information Recording Module)

As shown in FIG. 1, the information recording module 2 includes a controller 21 and the non-volatile memory 22.

The controller 21 is a module that performs overall control of the non-volatile memory 22, and preferably is configured as a system LSI including a CPU and the like. The controller 21 includes an access module interface unit 211, a CPU 212, a RAM 213, a ROM 214, and a non-volatile memory interface unit 215. Note that the function units of the controller 21 may be connected by an internal bus as shown in FIG. 1, or all or some of the function units may be directly connected to each other.

The access module interface unit 211 is a connection unit (interface) that connects the information recording module 2 and the access module 1. Similarly to the information recording module interface unit 13, the access module interface unit 211 exchanges control signals and data with the access module 1 via the bus 3.

The ROM 214 stores a program for controlling the information recording module 2, and this program uses the RAM 213 as a temporary storage area and runs on the CPU 212.

The ROM 214 includes a recording block management control unit 217.

Note that although it is assumed in the present embodiment that the function unit in the ROM 214 (the recording block management control unit 217) is realized by software in the ROM 214, there is no limitation to this, and all or part of the function unit may be realized by hardware.

The recording block management control unit 217 is a control unit that manages data storage locations in the non-volatile memory 22 in block units, determines which block is to be written to in accordance with a data writing instruction issued to the information recording module 2 by the access module 1, and performs processing for writing to that block. The recording block management control unit 217 does not exist in a conventional information recording module 2. Details of this control unit will be described later.

Also, the RAM 213 holds address management information 216 that is used by the recording block management control unit 217 as information for control.

The non-volatile memory interface unit 215 is a connection unit that connects the controller 21 and the non-volatile memory 22, and controls the exchange of commands and data with the non-volatile memory 22.

Based on information notified by the access device 1, the information recording module 2 of the present embodiment determines whether (1) recording to a video file (a file related to content) or (2) recording to a management file (a file accompanying content) is to be performed, and stores a video file and a management file respectively in different physical blocks based on the result of the determination. Also, in the real-time information recording system 1000, along with notifying the information recording module 2 of information related to recording blocks, regardless of whether processing for adding to file data or overwriting file data is to be performed, the access module 1 sequentially records data in a predetermined block while padding the data as necessary, and changes links in the FAT (305 or 306). Due to the access module 1 performing processing in this way, file data recording can always be performed by sequential recording in the real-time information recording system 1000. Specifically, in the real-time information recording system 1000, by combining the access module 1 and the information recording module 2, even in the case of recording a plurality of different-sized files such as a video file and a management file in parallel, it is possible to prevent a decrease in the recording speed by suppressing needless copy processing performed in the information recording module 2, and record data to the information recording module 2 stably and at high speed.

<<Configuration of Non-Volatile Memory>>

Figure 7:
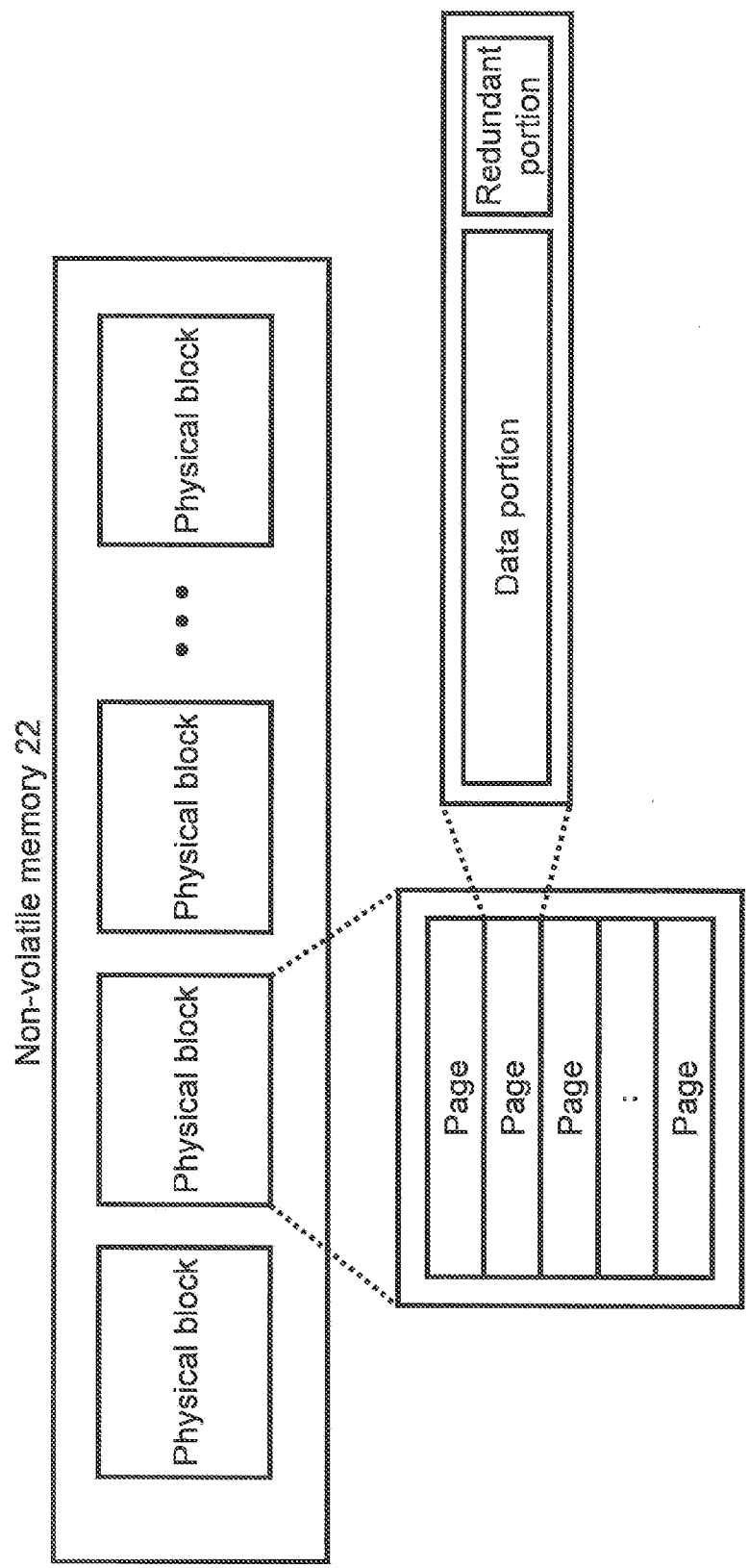
FIG. 7 is an illustrative diagram showing an example of a configuration of a non-volatile memory according to Embodiment 1.

Next is a description of a configuration of the non-volatile memory 22 according to the present embodiment with reference to FIG. 7.

A NAND-type flash memory, for example, is used as the non-volatile memory 22. The non-volatile memory 22 is configured by a plurality of physical blocks. A physical block is the unit of data erasure, and data needs to be erased in this unit before data is written. Also, each physical block is configured by a plurality of pages. A page is the unit of data writing. Also, each page includes a data portion and a redundant portion. The data portion is an area that can be accessed as a logical address space by the access module 1, and is the area where file data and the like is actually stored. On the other hand, the redundant portion is an area where ECC, management information of the non-volatile memory 22, and the like are stored, and is an area that cannot be accessed by the access module 1. The data portion is, for example, 4 KB in size, and the redundant portion is, for example, approximately 128 bytes in size. Also, if focus is placed on only the data portion, the physical block is, for example, approximately 512 KB in size. Accordingly, in the case where, for example, the non-volatile memory 22 is configured by 2,048 physical blocks of this size, the non-volatile memory 22 has a capacity of 1 GB.

<1.2: Operations of Real-Time Information Recording System>

The following describes operations of the real-time information recording system 1000 having the above configuration.

(1.2.1: Address Management Information)

Figure 8:
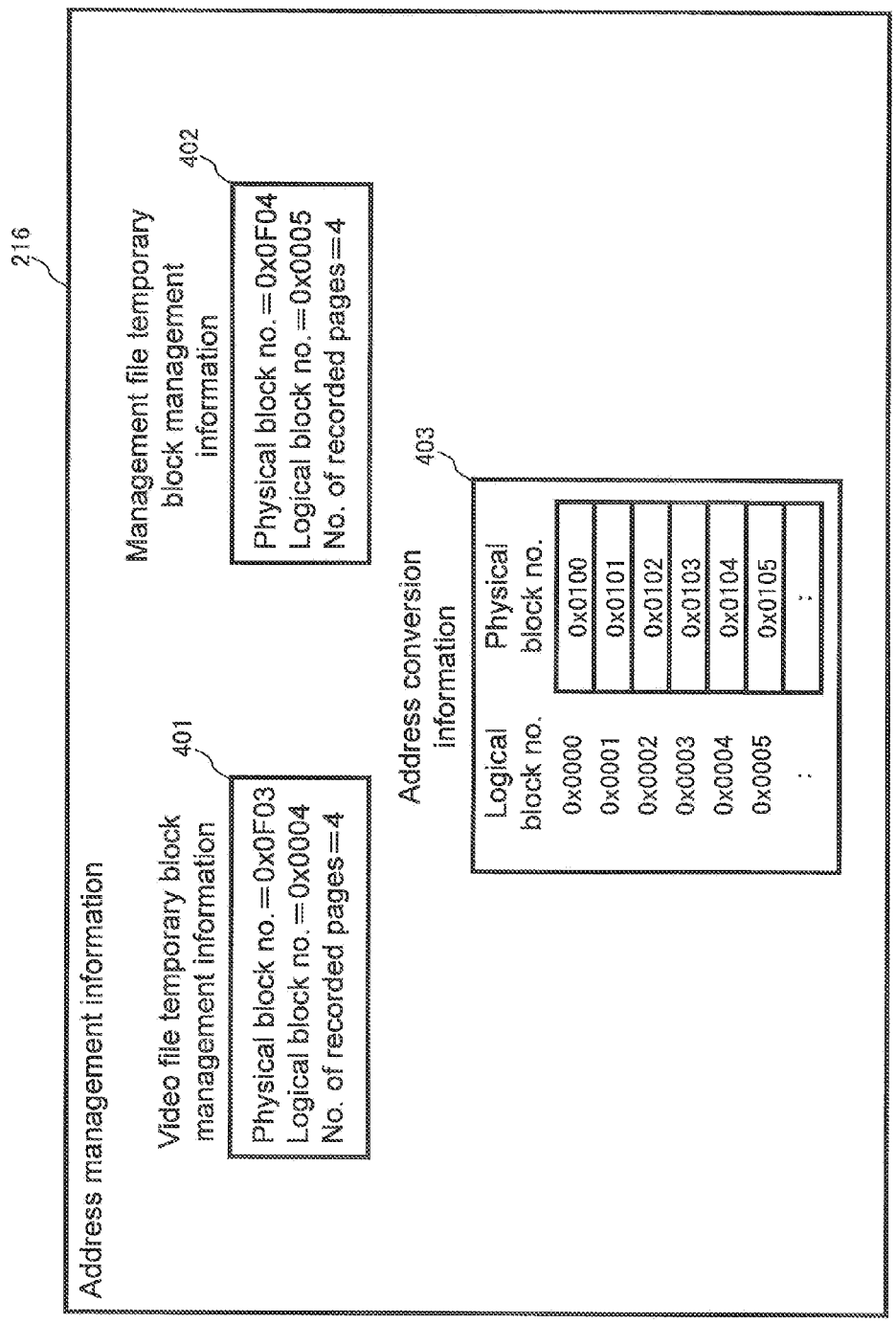
FIG. 8 is an illustrative diagram showing an example of a configuration of address management information according to Embodiment 1.

First, a description of the address management information 216 according to the present embodiment will be given with reference to FIG. 8. FIG. 8 is a diagram illustrating the address management information 216.

As shown in FIG. 8, the address management information 216 includes video file temporary block management information 401, management file temporary block management information 402, and address conversion information 403.

The video file temporary block management information 401 is information related to the location of a block allocated for video file data recording, and is information used by the recording block management control unit 217 of the information recording module 2 to manage a video file temporary block (a video file cache block).

The management file temporary block management information 402 is information related to the location of a block allocated for management file data recording, and is information used by the recording block management control unit 217 of the information recording module 2 to manage a management file temporary block (a management file cache block).

The address conversion information 403 is information indicating the correspondence relationship between the physical addresses and logical addresses of the physical blocks in the non-volatile memory 22. This information is similar to information held by a conventional information recording module 2 (information generally called an "address conversion table", a "logical address/physical address conversion table", or the like).

Based on information notified by the access module 1, the information recording module 2 of the present embodiment records a video file and a management file to sequential addresses in separate blocks. Accordingly, in the real-time information recording system 1000, even in the case of recording a video file and a management file in parallel, the video file and the management file are respectively sequentially recorded in different blocks, thereby suppressing needless copy processing performed in non-volatile memory 22 (suppressing the occurrence of so-called saving process (aggregation process)), and enabling data to be recorded at high speed.

Furthermore, in the real-time information recording system 1000, the access module 1 allocates different blocks as areas for storing a video file and a management file respectively, and records data to sequential addresses in order from the head of the allocated blocks (the access module 1 controls the information recording module such that data is recorded in such a manner). Also, in the real-time information recording system 1000, if processing for overwriting data in a management file is to be performed, new data (overwrite data) is recorded in the management file storage block described above, and links in the FAT (305 or 306) are changed, thus realizing overwrite processing by recording data to sequential addresses. For this reason, in the real-time information recording system 1000, even if processing for overwriting data in a management file is to be performed, needless copy processing in the non-volatile memory 22 can be suppressed (the occurrence of so-called saving process (aggregation process) can be suppressed), and high-speed data recording can be guaranteed.

(1.2.2: Data Recording Procedure)

Next is a description of a detailed data recording procedure performed in the real-time information recording system 100 of the present embodiment.

In the following description, it is assumed that the physical block size is 512 KB, the physical page size is 4 KB, and the cluster size of the file system is 16 KB, and the case of recording a video file and a management file in cluster unit is taken as an example in the description.

<<Procedure of Processing for Writing Video File and Management File>>

First, an overview of the procedure of processing for writing a video file and a management file performed in the real-time information recording system 1000 will be described with reference to FIG. 9.

Figure 9:
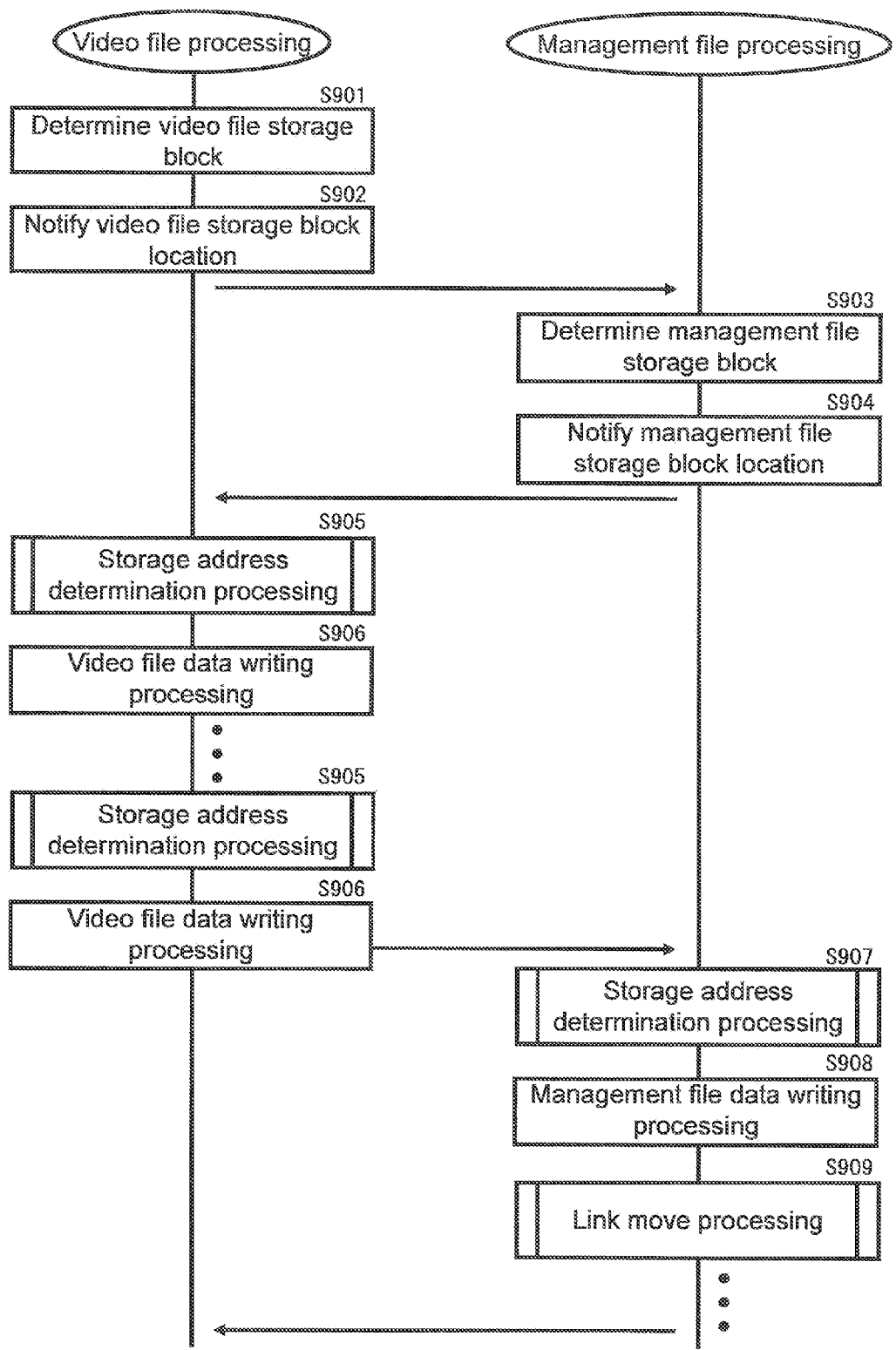
FIG. 9 is a flowchart showing an overall procedure of parallel writing of a video file and a management file according to Embodiment 1.

FIG. 9 is a diagram showing an overall procedure for writing a video file and a management file in parallel performed in the real-time information recording system 1000, and the processing procedure performed in the case where a video file and a management file are written in parallel in an arbitrary order is shown.

(S901):

In S901, the storage address determination processing unit 104 of the access module 1 determines a storage block for the video file. In the real-time information recording system 1000, the access module 1 needs to be aware of, for example, the block length, the optimum writing processing unit for writing to the information recording module 2, and the like. In the real-time information recording system 1000, the access module 1 may acquire such information from the information recording module 2 in advance (case 1), or fixed values held by the access module 1 in advance may be used as such information (case 2). In the latter case (case 2), the fixed values may be determined according to the capacity of the information recording module 2 (e.g., the block size is set to 512 KB if the capacity of the information recording module 2 is 2 GB or less, and the block size is set to 4 MB if the capacity of the information recording module 2 exceeds 2 GB), or the fixed values may be determined using other information. Here, it is assumed that the optimum writing processing unit is 16 KB and the block length is 512 KB in the real-time information recording system 1000. In other words, in the present embodiment, description is given taking the example of the case where in the real-time information recording system 1000, the access module 1 records data in cluster units (=16 KB) in a 512 KB area in which all the clusters are free clusters. Here, it is assumed that the video file is always newly created, and data is not overwritten to an existing file, and it is assumed that in the storage block determination in S901, a free block configured entirely by free clusters is acquired and allocated as the video file storage block.

(S902):

In S902, the access module 1 notifies the information recording module 2 of the location information of the video file storage block determined in S901. The information recording module 2 sets the information notified by the access module 1 as the video file temporary block management information, and manages that block as a video file recording area. Details of the storage block information registration processing performed in the information recording module 2 will be described later.

(S903):

In S903, similarly to S901, the storage address determination processing unit 104 of the access module 1 determines a management file storage block. Similarly to S901, it is assumed that a free block configured entirely by free clusters is acquired and allocated as the management file storage block.

(S904):

In S904, similarly to S902, the access module 1 notifies the information recording module 2 of the location information of the management file storage block determined in S903. The information recording module 2 sets the information notified by the access module 1 as the management file temporary block management information, and manages that block as the management file recording area. Details of the storage block information registration processing performed in the information recording module 2 will be described later.

(S905):

In S905, the storage address determination processing unit 104 of the access module 1 then determines an address to which data of the video file is to be recorded. Since the case of recording video file data one cluster at a time is assumed in this example, in actuality, the storage address determination processing unit 104 performs processing for acquiring one free cluster and determining the address of the free cluster as the video file data recording address. Details of the storage address determination processing will be described later.

(S906):

In S906, the file system control unit 102 of the access module 1 writes the video file data to the address determined in S905 (the file system control unit 102 of the access module 1 instructs the information recording module 2 to write the video file data to the address determined in S905). This writing processing is similar to that performed by conventional access modules.

Also, the processing of S905 and S906 is performed as a set, and is processing for writing part of the video file data (one cluster-worth of data is assumed in this example). For this reason, in the real-time information recording system 1000, the processing of S905 and S906 is a set, and the processing of S905 and S906 is repeatedly performed a necessary number of times. Here, the processing of S907 is performed when the management file writing processing is to be performed at an arbitrary timing. Note that in the real-time information recording system 1000, the timing at which management file writing processing is performed is determined according to the specifications of the real-time information recording system 1000, the standard applied to the real-time information recording system 1000, and the like.

(S907):

In 5907, similarly to S905, the storage address determination processing unit 104 of the access module 1 then determines an address to which data of the management file is to be recorded. In this example, since the case where the management file data is recorded one cluster at a time in the real-time information recording system 1000 is assumed, in actuality the storage address determination processing unit 104 performs processing for acquiring one free cluster and determining the address of the free cluster as the management file data recording address. Also, in the case where processing for writing data whose size is less than that of one cluster is to be performed in the real-time information recording system 1000, processing is performed in which one cluster-worth of old data is read out and merged with the new data, and the resulting data is written back to one cluster, and therefore in any case, the storage address determination processing unit 104 acquires one entire free cluster. Details of the storage address determination processing will be described later.

(S908):

In S908, the file system control unit 102 of the access module 1 writes the management file data to the address determined in S907. Although this writing processing is similar to that of conventional access modules, in the case of overwrite processing (processing for overwriting (updating) data) in the real-time information recording system 1000, data is necessarily recorded to a new free cluster, and the cluster storing the old data is not overwritten. Accordingly, in the real-time information recording system 1000, processing for sequentially writing data to the information recording module 2 is performed (sequential writing processing can be guaranteed), thereby enabling high-speed recording of data.

(S909):

In S909, the link move processing unit 105 of the access module 1 changes the links of the management file in the FAT (305 or 306). In the real-time information recording system 1000, since the link move processing unit 105 performs link changing when overwrite processing is to be executed, data is not overwritten to the same logical address. Accordingly, in the real-time information recording system 1000, it can be guaranteed that data is sequentially written to the information recording module 2. The link move processing differs in the case of addition (data addition processing) and in the case of overwriting (data overwrite processing), and details of the processing in each case will be described later. Also, in actuality, processing for updating the FAT (305 or 306) is necessary for a video file as well, but a description of this has been omitted due to being the same as conventional processing for updating the FAT (305 or 306).

Also, the processing of S907 to S909 is performed as a set, and is processing for writing part of the management file data (one cluster-worth of data is assumed in this example), and therefore in the real-time information recording system 1000, the processing of S907 to S909 is repeatedly performed as a set a necessary number of times. Here, the processing of S905 is performed when the video file writing processing is to be performed at an arbitrary timing.

Note that in the real-time information recording system 1000, the timing at which video file writing processing is performed is determined according to the specifications of the real-time information recording system 1000, the standard applied to the real-time information recording system 1000, and the like.

(1.2.3: Storage Destination Logical Addresses when Writing Video File and Management File in Parallel)

Figure 10:
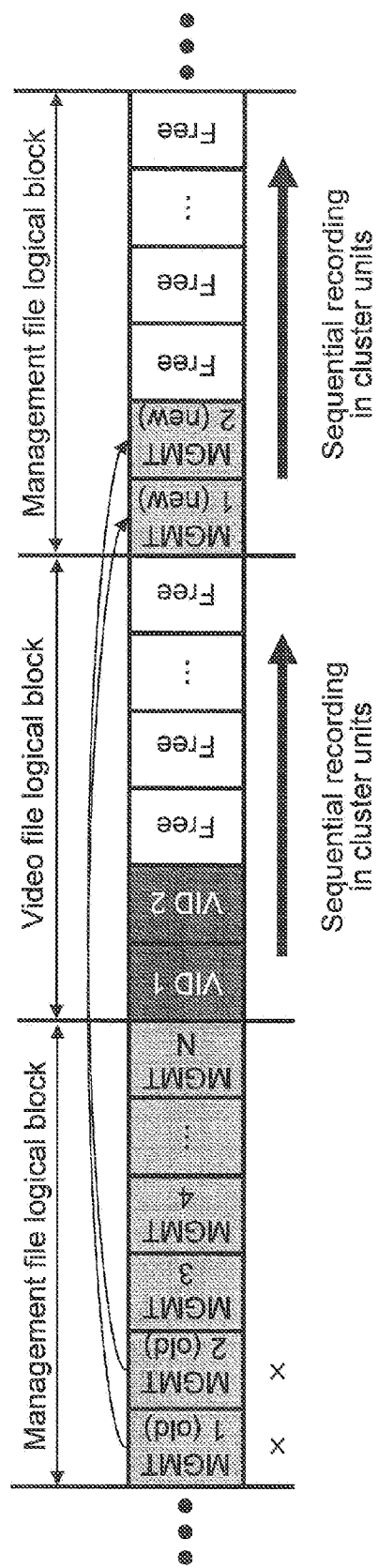
FIG. 10 is an illustrative diagram showing an example of storage destination logical addresses when writing a video file and a management file in parallel according to Embodiment 1.

Next is a description of an example of storage destination logical addresses when writing a video file and a management file in parallel in the real-time information recording system 1000 of the present embodiment, with reference to FIG. 10.

In FIG. 10, clusters are each indicated by a rectangle. Also, FIG. 10 shows that a block is configured by a plurality of clusters (three blocks (logical blocks) are shown in FIG. 10). In the writing processing procedure described with reference to FIG. 9, in the real-time information recording system 1000, different free blocks are allocated for a video file and a management file respectively, and data is written in order from the head of the block.

Since the video file is newly created, overwrite processing is not performed, and data is written sequentially, in order from the head of the allocated block (portions "VID 1" and "VID 2" in FIG. 10).

On the other hand, although there are cases where management file data is overwritten, new data is necessarily written sequentially, in order from the head of the allocated block (portions "MGMT 1 (new)" and "MGMT 2 (new)" in FIG. 10). Also, in the real-time information recording system 1000, in the case where management file data is overwritten, links in the FAT (305 or 306) are changed, and the FAT (305 or 306) is updated such that old data is overwritten with new data (the links are changed such that "MGMT 1 (old)" and "MGMT 2 (old)" in FIG. 10 are overwritten with "MGMT 1 (new)" and "MGMT 2 (new)").

In this way, in the real-time information recording system 1000, different blocks are allocated for a video file and a management file respectively, and regardless of whether addition processing (data addition processing) or overwrite processing (data overwrite processing) is to be executed, data is always sequentially written in order from the head of the block. Accordingly, it is always guaranteed that data is sequentially recorded to the information recording module 2 in the real-time information recording system 1000. As a result, data can be recorded at high speed in the real-time information recording system 1000.

(1.2.4: Storage Address Determination Processing (Processing by Access Module 1))

Figure 11:
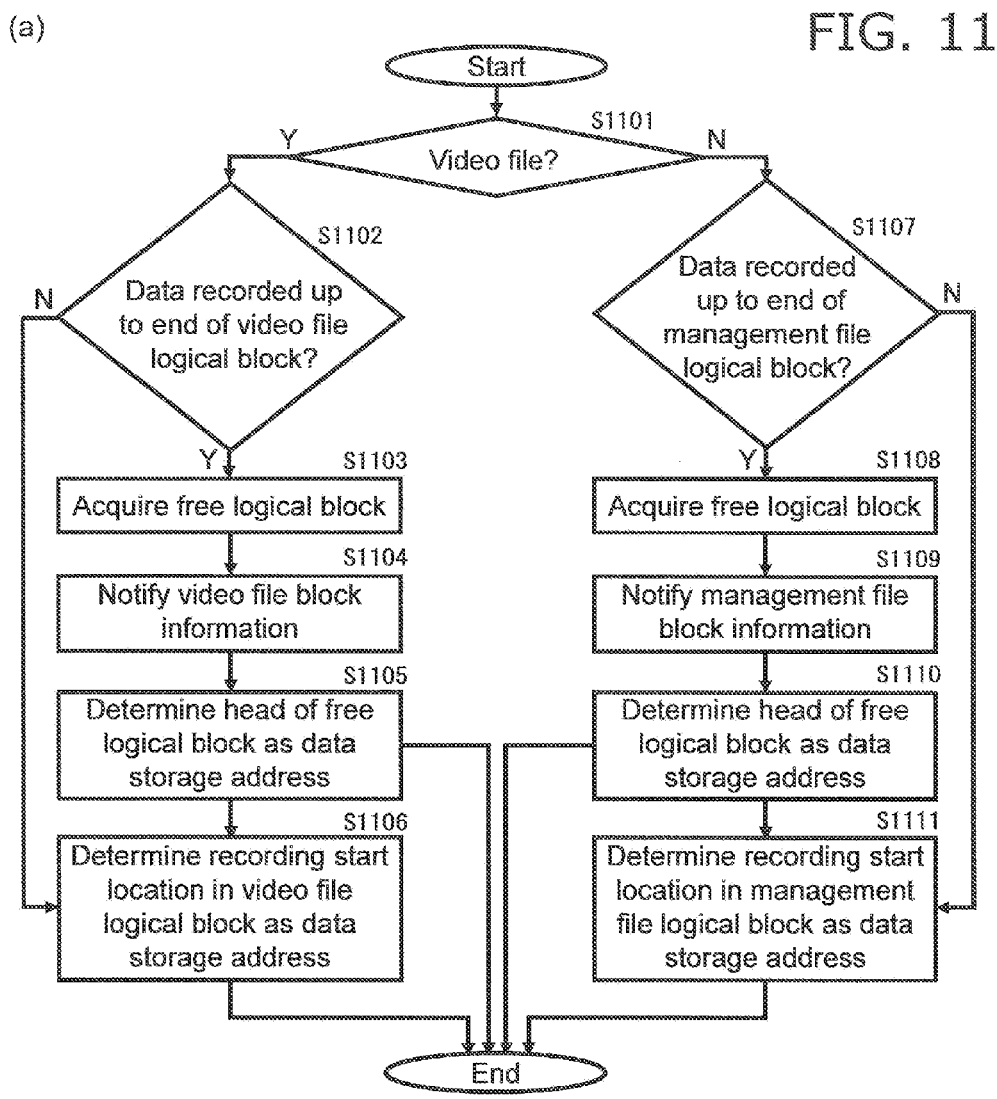
FIG. 11 shows a flowchart showing details of a procedure of storage address determination processing according to Embodiment 1.
Figure 11:
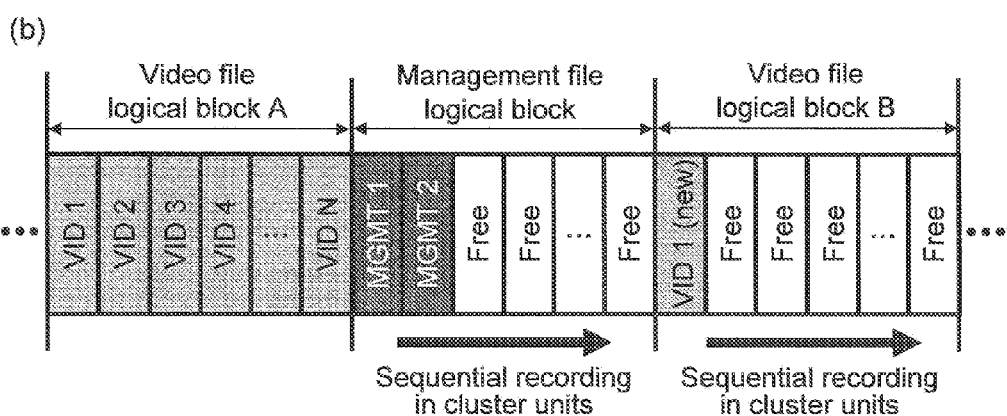

Next is a description of details of the storage address determination processing with reference to (a) in FIG. 11. In FIG. 11, (a) is a flowchart showing the storage address determination processing.

The storage address determination processing corresponds to the procedure shown in S905 and S907 in the processing procedure in FIG. 9.

<<Video File/Management File Determination Processing>>

(S1101):

In S1101, the storage address determination processing unit 104 of the access module 1 determines whether the file to be recorded is a video file or a management file. In the case of a video file, the procedure proceeds to the processing of S1102. In the case of a management file, the procedure proceeds to the processing of S1107.

<<Video File Processing>>

(S1102):

In S1102, the storage address determination processing unit 104 determines whether data has been written up to the end of the logical block currently allocated as the video file logical block. The procedure proceeds to the processing of S1103 if the result of the determination is that data has been written up to the end, and proceeds to the processing of S1106 if data has not been written up to the end. It is assumed in the description in the present embodiment that the writing processing size is the cluster size (=16 KB), and that the block size is 512 KB. For this reason, a 512-KB free area is allocated as the video file logical block, and in the determination processing of S1102, it is determined whether video file data has been written up to the end of the 512 KB.

(S1103):

In S1103, since data has been written up to the end of the video file logical block, the file system control unit 102 acquires a new free logical block. Specifically, the file system control unit 102 acquires a logical block in which the 512 KB is entirely configured by free clusters.

(S1104):

In S1104, the access module 1 notifies the information recording module 2 of the location information of the free logical block acquired in S1103 as the location information of the video file storage block. The information recording module 2 sets the information notified by the access module 1 as the video file temporary block management information 401, and manages that block as a video file recording area. This processing is the same as the processing of S902 in FIG. 9, and will be described in detail later.

(S1105):

In S1105, the storage address determination processing unit 104 determines the start address of the free logical block acquired in S1103, as the video file storage address, and thereafter ends the processing.

(S1106):

In S1106, the storage address determination processing unit 104 determines the next address after the area in which writing has ended in the block currently allocated as the video file logical block, as the video file storage address, and thereafter ends the processing. For example, as shown in (b) of FIG. 11, in the case where data has been recorded up to the end of the video file logical block A, the storage address determination processing unit 104 determines the first address of the first cluster in the video file logical block B (the cluster indicated by "VID 1 (new)" in (b) of FIG. 11), as the video file storage address.

<<Management File Processing>>

(S1107 to S1111):

In S1107 to S1111, processing similar to the video file processing from S1102 to S1106 is performed as management file processing. The details are substantially the same as that of the video file processing, and therefore a description thereof has been omitted.

In this way, in the real-time information recording system 1000, by performing the processing shown in FIG. 11, free logical blocks are allocated for a video file and a management file respectively, and data is recorded in order from the head of the block, and therefore the next address after the area in which writing has ended in the block is determined as the file data storage address.

(1.2.5: Storage Block Information Registration Processing (Processing by Information Recording Module 2))

Figure 12:
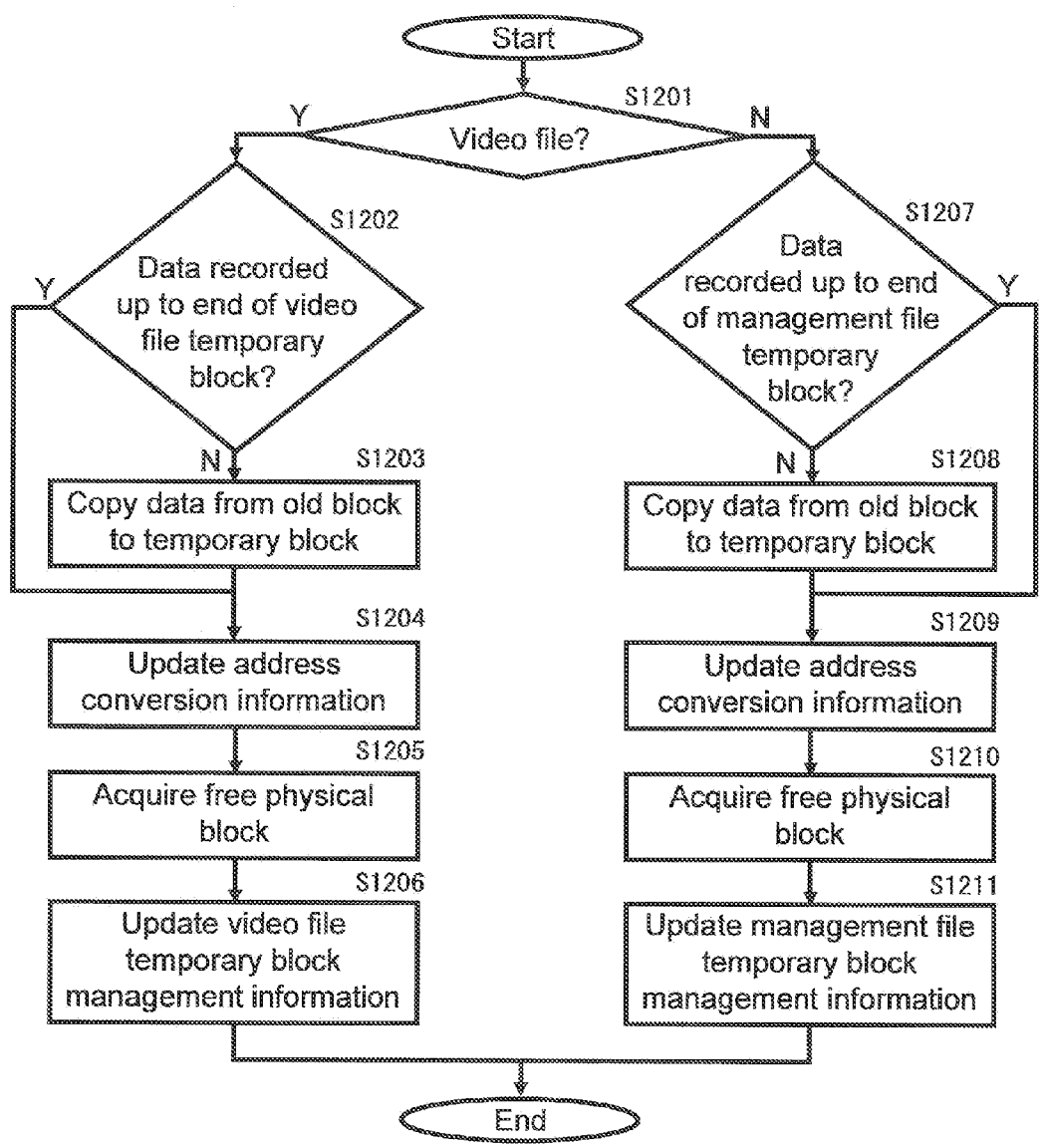
FIG. 12 is a flowchart showing details of a procedure of storage block information registration processing according to Embodiment 1.

Next is a description of details of the storage block information registration processing with reference to FIG. 12.

The storage block information registration processing corresponds to, in the processing procedure in FIG. 9, the processing performed by the information recording module 2 in the case where the access module 1 has performed the procedure shown in S902 and S904. Specifically, after the access module 1 has determined the data storage block for the video file/management file, the access module 1 notifies the information recording module 2 of the location information of the data storage block. The processing performed by the information recording module 2 at this time is the storage block information registration processing in FIG. 12.

<<Video File/Management File Determination Processing>>

(S1201):

The recording block management control unit 217 of the information recording module 2 determines whether the file to be recorded is a video file or a management file. The access module 1 notifies the information recording module 2 of which file is to be recorded. In the case of a video file, the procedure proceeds to the processing of S1202. In the case of a management file, the procedure proceeds to the processing of S1207.

<<Video File Processing>>

(S1202):

In S1202, the recording block management control unit 217 of the information recording module 2 determines whether data has been written up to the end of the physical block currently allocated as the video file temporary block. The procedure proceeds to the processing of S1204 if the result of the determination is that data has been written up to the end, and proceeds to the processing of S1203 if data has not been written up to the end. It is assumed in the description in the present embodiment that the writing processing size is the cluster size (=16 KB), and that the block size is 512 KB. For this reason, a 512-KB free area is allocated as the video file temporary block. Accordingly, in the real-time information recording system 1000 of the present embodiment, it is determined whether video file data has been written up to the end of the 512 KB.

(S1203):

In the storage block information registration processing, in the real-time information recording system 1000, a logical block other than the currently allocated logical block is allocated as the video file temporary block, and therefore the processing of (1) and (2) below needs to be performed. Note that corresponding portions of FIG. 13 that will be described later are used for illustration here in order to simplify the description.

(1) Data (old data) stored in the physical block (the physical block with the physical block number 0x0104 in FIG. 13) that corresponds to the logical block (the logical block with the logical block number 0x0004 in FIG. 13) currently allocated as the video file temporary block (the physical block with the physical block number 0x0F03 in FIG. 13) is merged with the data in the video file temporary block (the physical block with the physical block number 0x0F03 in FIG. 13) (the valid data is merged).

(2) The area of the video file temporary block (the physical block with the physical block number 0x0F03 in FIG. 13) is then released.

Figure 13:
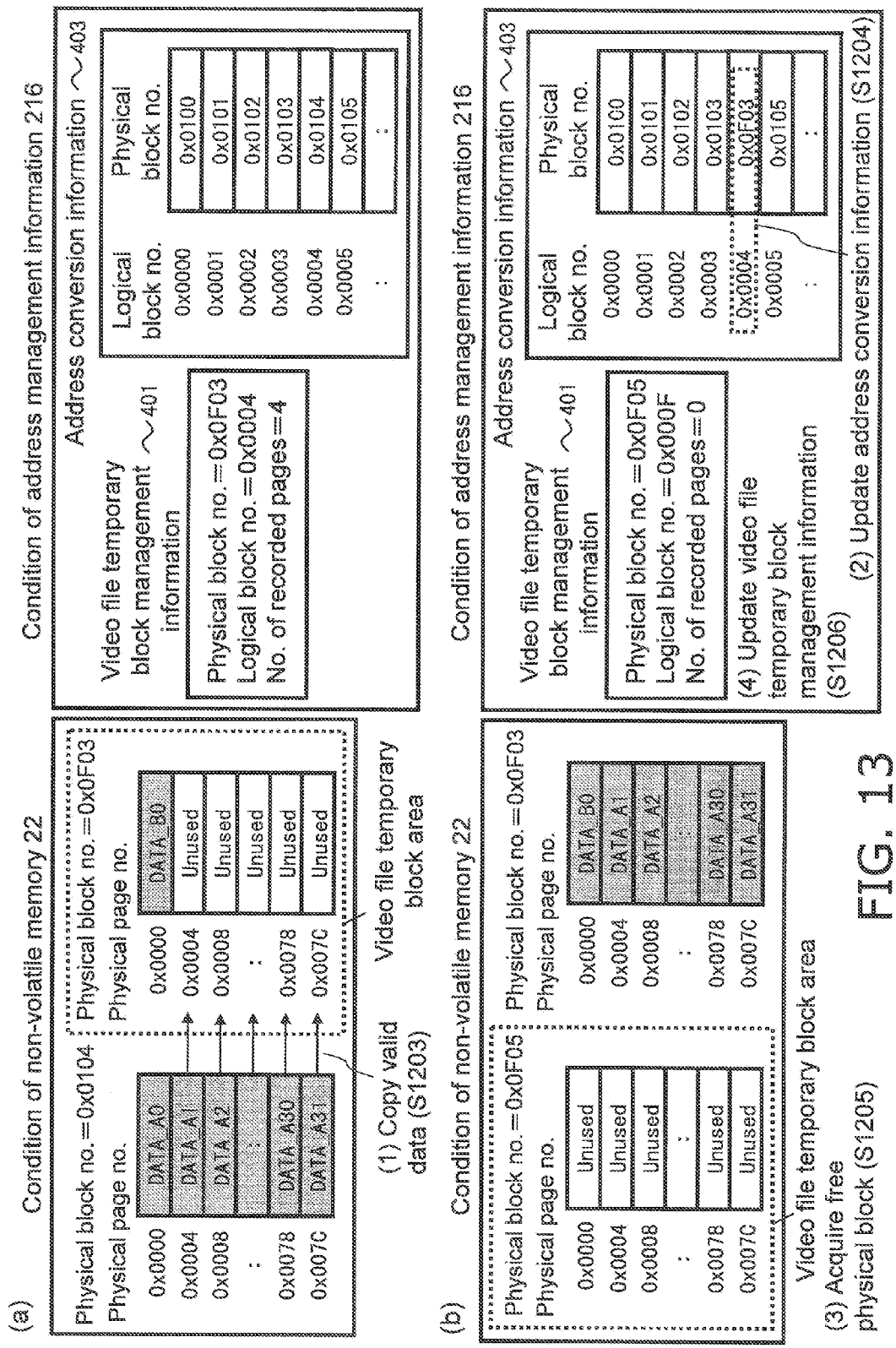
FIG. 13 is an illustrative diagram showing examples of conditions of the non-volatile memory and the address management information according to Embodiment 1.

Since this processing of (1) and (2) needs to be performed, in S1203 the information recording module 2 copies the valid data in the old block (the physical block with the physical block number 0x0104 in FIG. 13) to the area of the video file temporary block (the physical block with the physical block number 0x0F03 in FIG. 13).

(S1204):

In S1204, the recording block management control unit 217 updates the address conversion information 403 in the address management information 216, and associates the physical block currently allocated to the video file temporary block with the corresponding logical block number.

(S1205):

In S1205, the information recording module 2 acquires a free physical block in order to newly allocate it as the video file temporary block.

(S1206):

In S1206, the recording block management control unit 217 registers the free physical block acquired in S1205 as the video file temporary block by updating the video file temporary block management information 401 in the address management information 216, and thereafter ends the processing.

<<Management File Processing>>

(S1207 to S1211):

In S1207 to S1211, processing similar to the video file processing from S1202 to S1206 is performed as management file processing. The details are substantially the same as that of the video file processing, and therefore a description thereof has been omitted.

In this way, in the real-time information recording system 1000, due to performing the processing shown in FIG. 12, information related to the current temporary blocks for the video file and management file is updated as necessary, thereafter new free physical blocks are acquired, and the new free physical blocks are registered as new temporary blocks.

FIG. 13 is a diagram showing conditions of the non-volatile memory 22 and conditions of the address management information 216 in the storage block information registration processing.

In FIG. 13, (a) shows the condition in which the recording of data has proceeded partway in the area of the video file temporary block (physical block number: 0x0F03) allocated to the logical block number 0x0004 (the condition in which a total of four pages-worth of data, that is to say, physical page numbers 0x0000 to 0x0003 of the video file temporary block with the physical block number 0x0F03, has been recorded). As shown in (a) of FIG. 13, in the address conversion information 403, the logical block with the logical block number 0x0004 is associated with the physical block with the physical block number 0x0104, and therefore the old data in the logical block with the logical block number 0x0004 is stored (recorded) in the physical block with the physical block number 0x0104.

In the real-time information recording system 1000, according to the storage block information registration processing, in the case where the video file temporary block area is re-allocated to the logical block number 0x000F, the valid data in the physical block number 0x0104 is copied to the video file temporary block area, and a different free physical block is registered as the new video file temporary block area. Specifically, in the case shown in FIG. 13, the storage block information registration processing is executed in the real-time information recording system 1000 through the processing of (1) to (4) below.

(1) "DATA_A1" to "DATA_A31" in the physical block with the physical block number 0x0104 is valid data (the data "DATA_A0" recorded in the page with the physical page number 0x0000 is invalid data since the data "DATA_B0" (valid data) exists in the physical page (physical page number 0x0000) corresponding to the video temporary block). Accordingly, the valid data "DATA_A1" to "DATA_A31" in physical block number 0x0104 is copied to the video file temporary block with the physical block number 0x0F03 (this processing corresponds to the processing of S1203 in FIG. 12).

(2) The address conversion information related to the logical block with the logical block number 0x0004 is updated (this processing corresponds to the processing of S1204 in FIG. 12).

Figure 3:
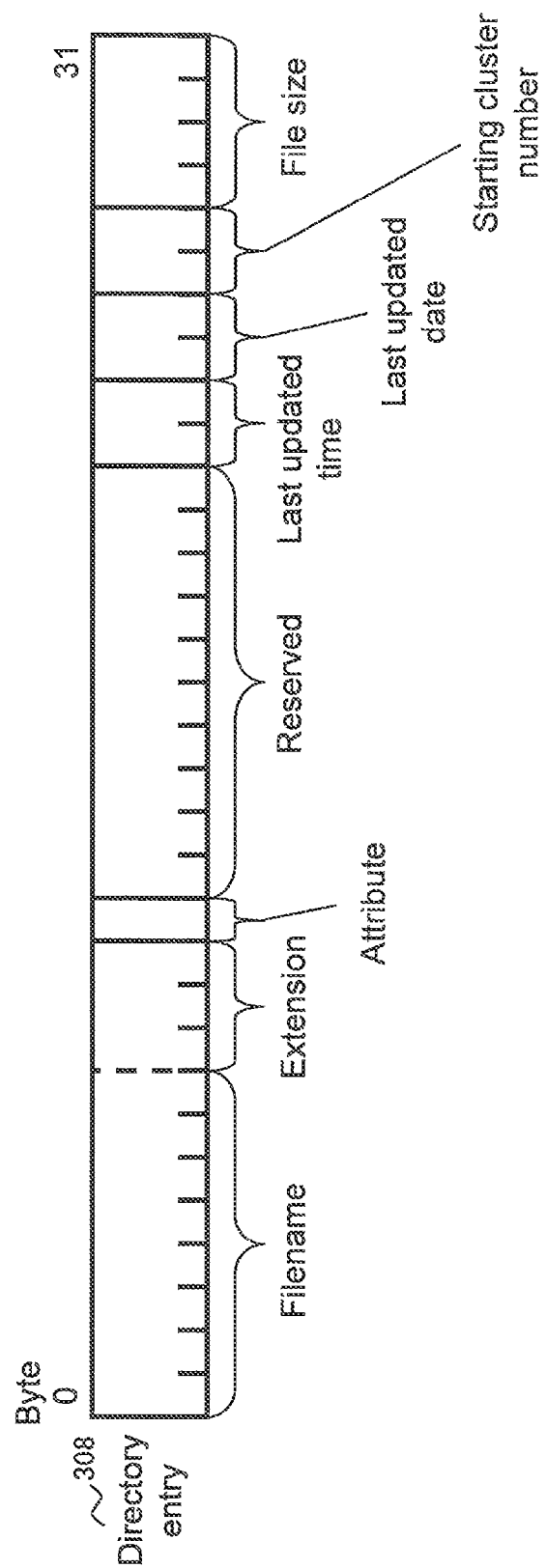
FIG. 3 is an illustrative diagram showing a configuration of a directory entry.
Figure 4:
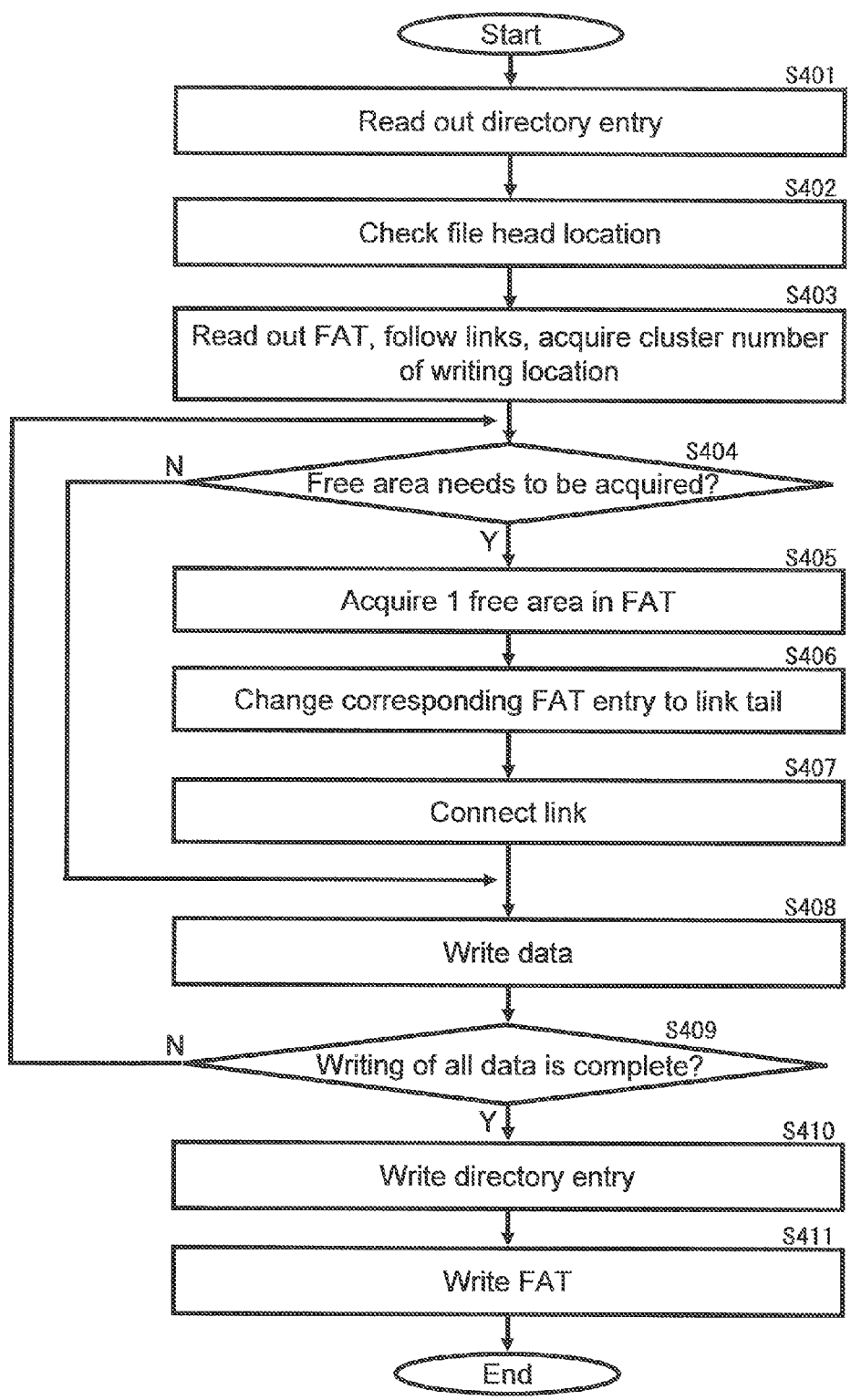
FIG. 4 is a flowchart showing a procedure file data writing processing in the FAT file system.
Figure 5:
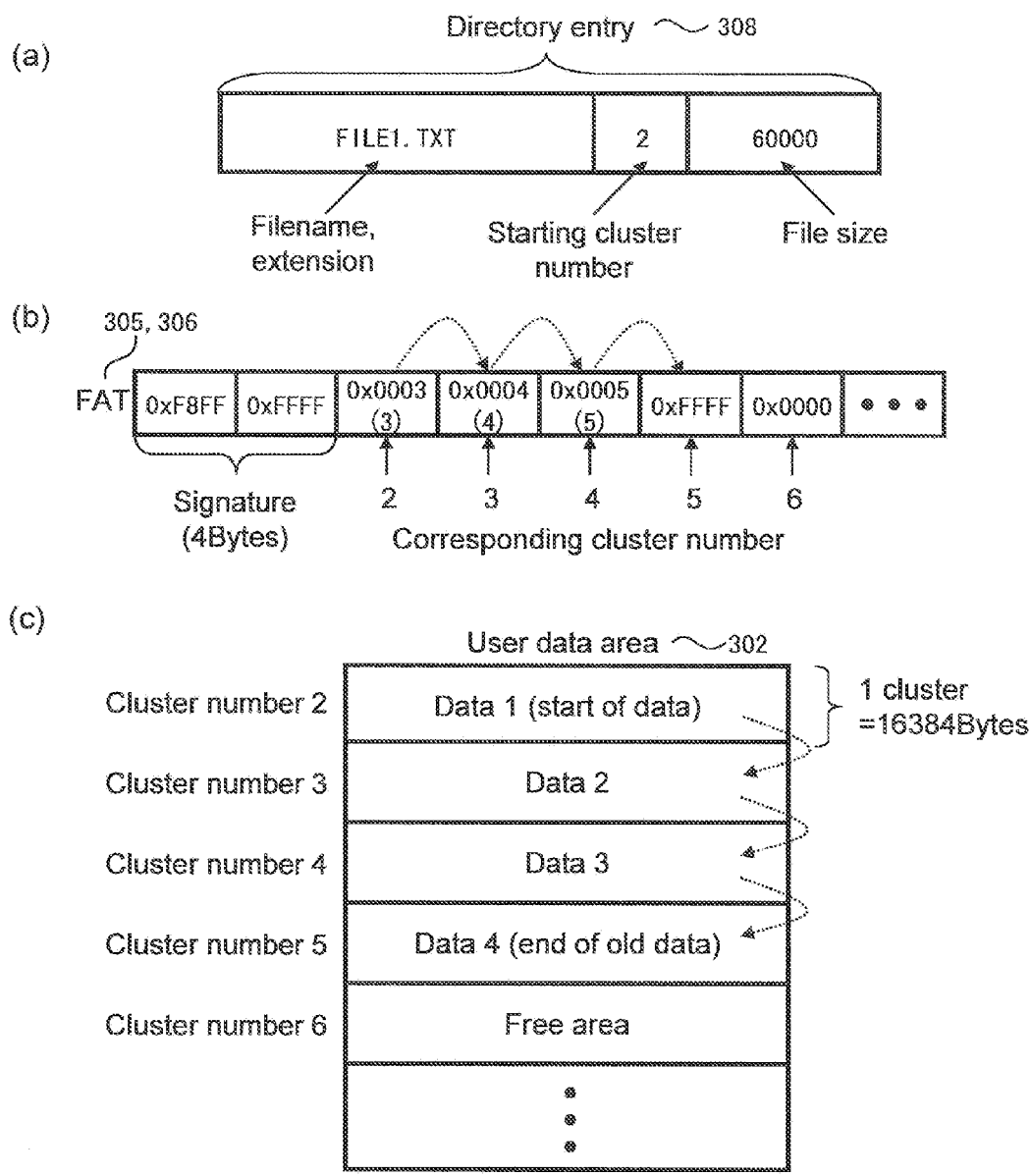
FIG. 5 is an illustrative diagram showing an example of a state before file data writing in the FAT file system.
Figure 6:
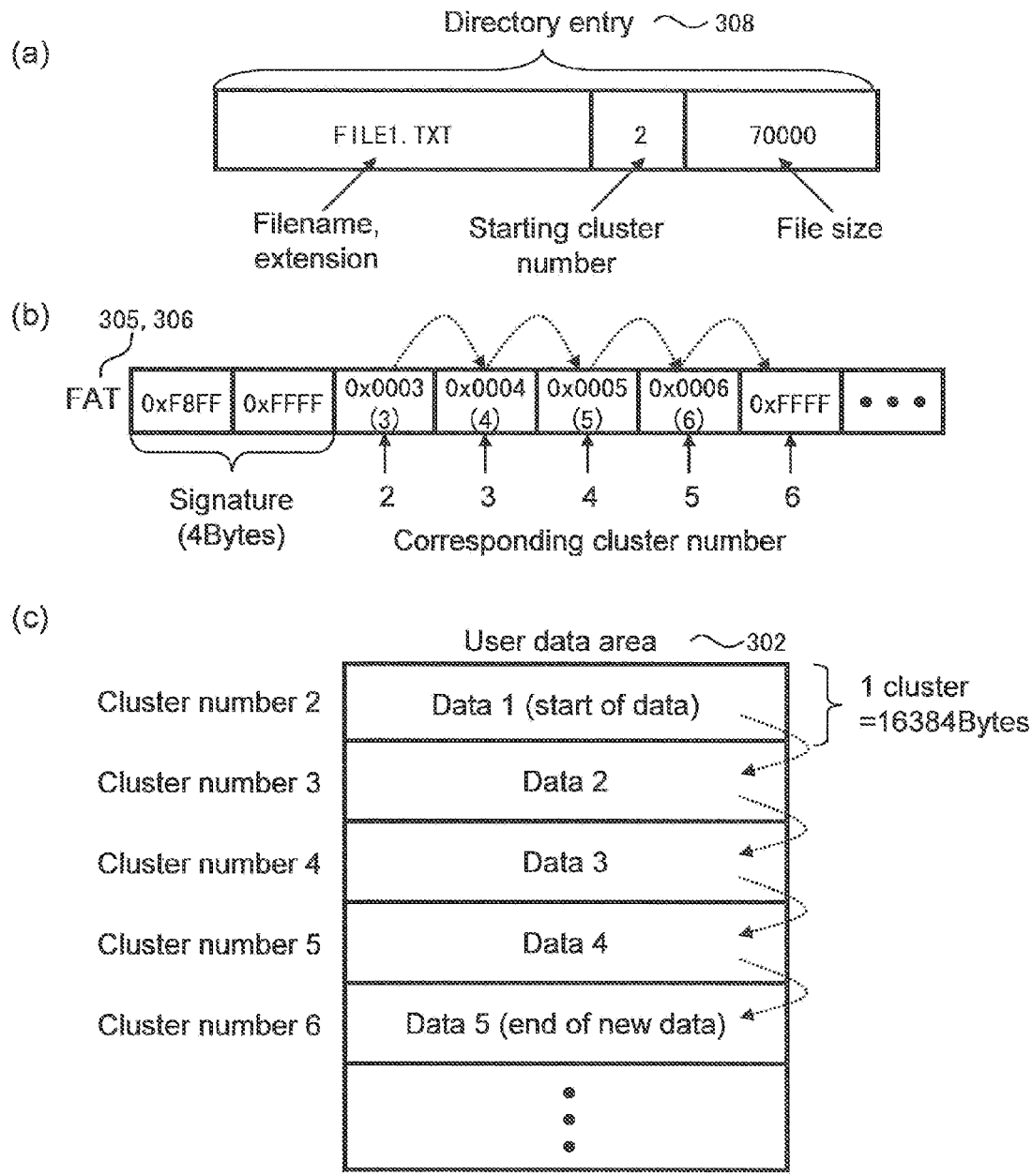
FIG. 6 is an illustrative diagram showing an example of a state after file data writing in the FAT file system.

(3) A free physical block (in the case in FIG. 3, the physical block with the physical block number 0x0F05) is acquired (this processing corresponds to the processing of S1205 in FIG. 12).

(4) The video file temporary block management information is updated (this processing corresponds to the processing of S1206 in FIG. 12).

Due to executing the processing of (1) to (4) above, the condition of the non-volatile memory 22 and the condition of the address management information 216 change to the conditions shown in (b) of FIG. 13.

In this way, in the storage block information registration processing performed in the real-time information recording system 1000, data corresponding to the logical block number allocated to the current video file temporary block area is organized and a new free physical block is allocated to a logical block designated by the access module 1 as the new video file temporary block area.

(1.2.6: Link Move Processing

Next is a description of the link move processing in the real-time information recording system 1000 of the present embodiment with reference to FIG. 14 to FIG. 18.

The link move processing corresponds to the procedure (processing) indicated by S909 in the processing procedure in FIG. 9.

Figure 14:
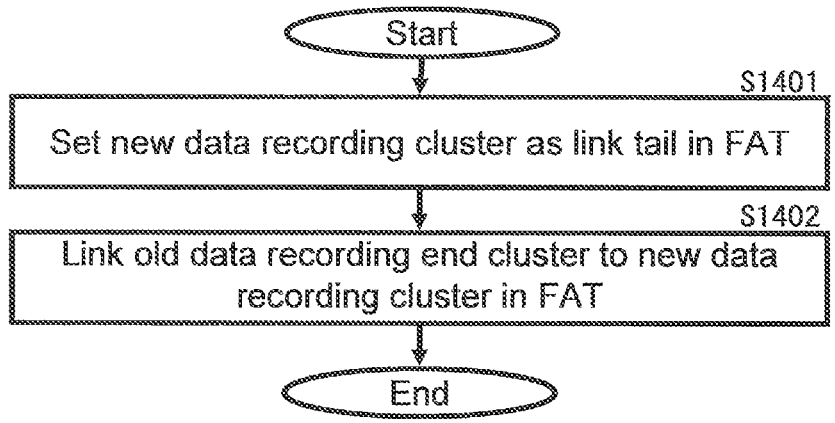
FIG. 14 is a flowchart showing details of a procedure of link move processing in the case of an addition according to Embodiment 1.

FIG. 14 is a diagram showing the link move processing procedure in the case where addition processing is executed.

Figure 15:
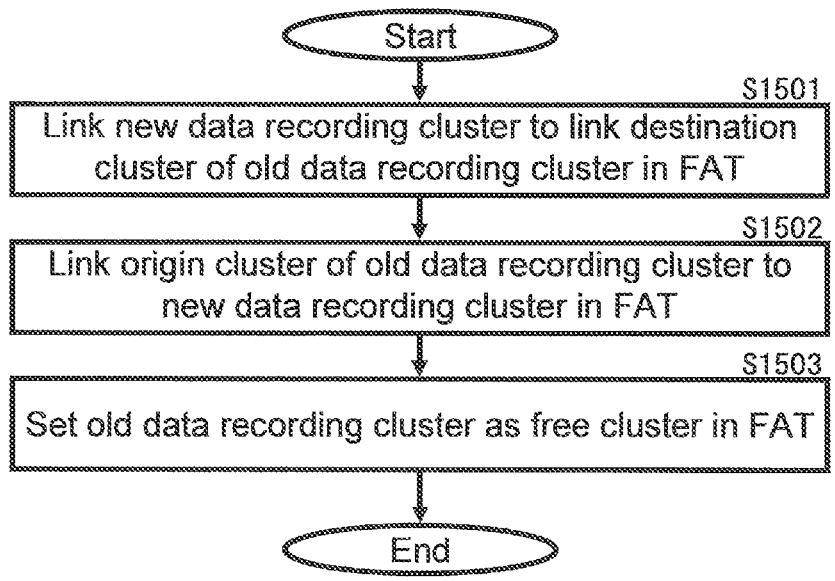
FIG. 15 is a flowchart showing details of a procedure of link move processing in the case of an overwrite according to Embodiment 1.

FIG. 15 is a diagram showing the link move processing procedure in the case where overwrite processing is executed.

Figure 16:
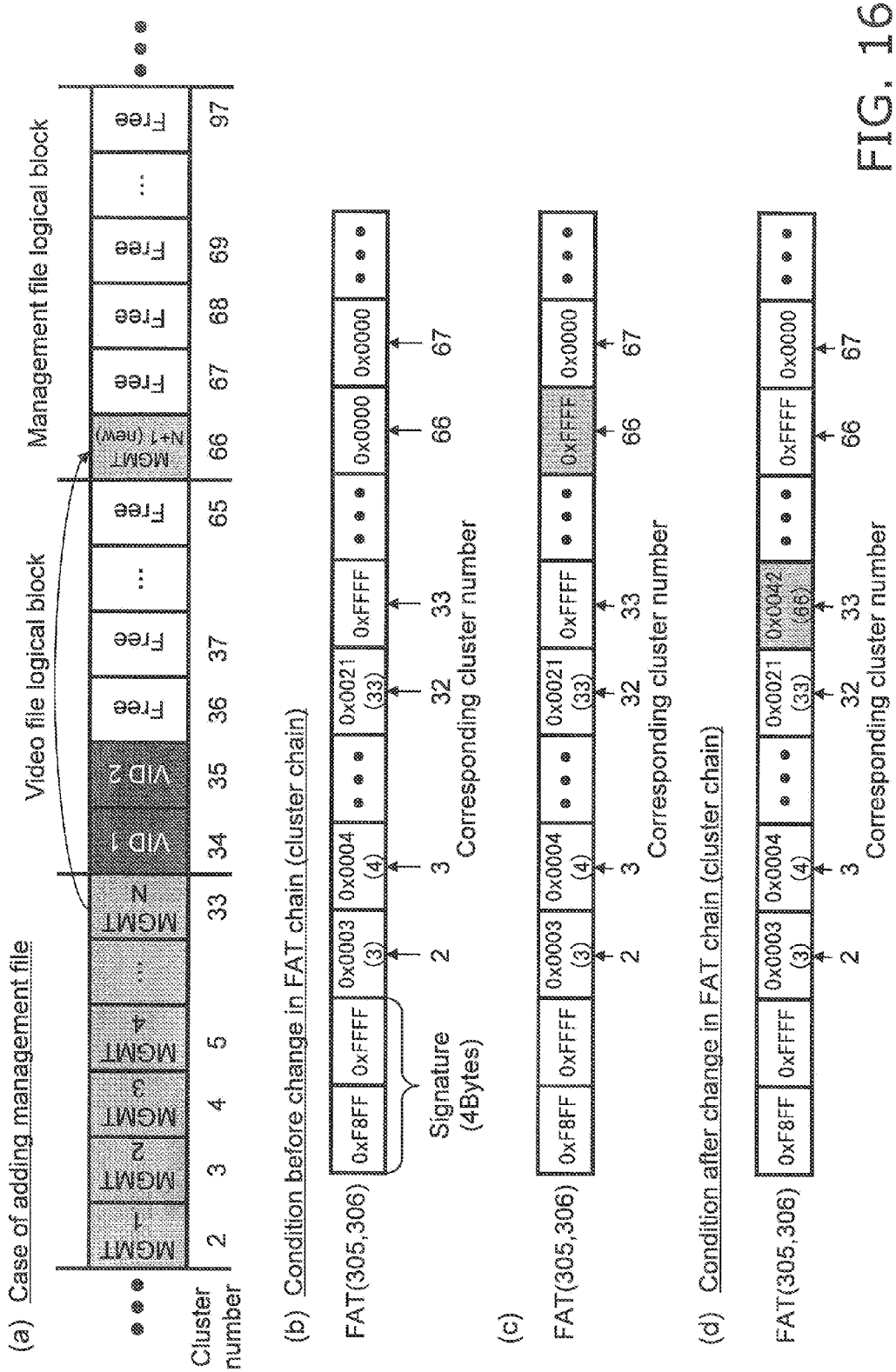
FIG. 16 is an illustrative diagram showing examples of conditions of a FAT in the case of an addition according to Embodiment 1.

FIG. 16 is a diagram showing conditions of the FAT (305 or 306) in the case where addition processing is executed.

Figure 17:
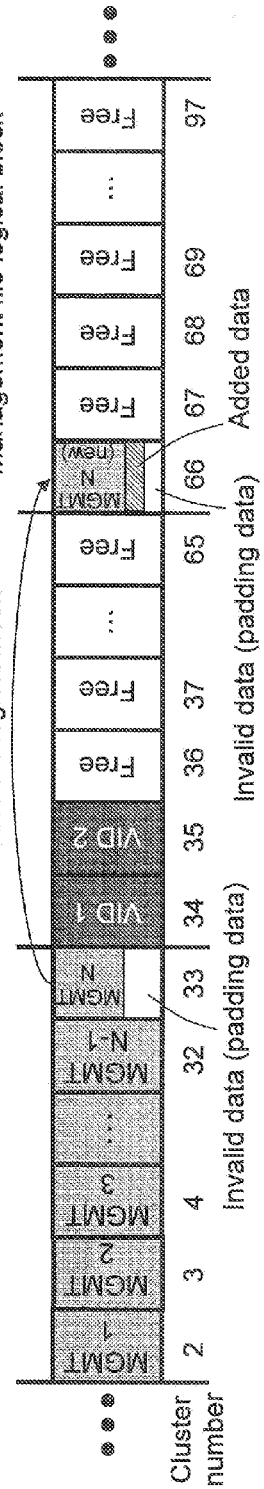
FIG. 17 is an illustrative diagram showing examples of conditions of the FAT in the case of an addition according to Embodiment 1.
Figure 17:
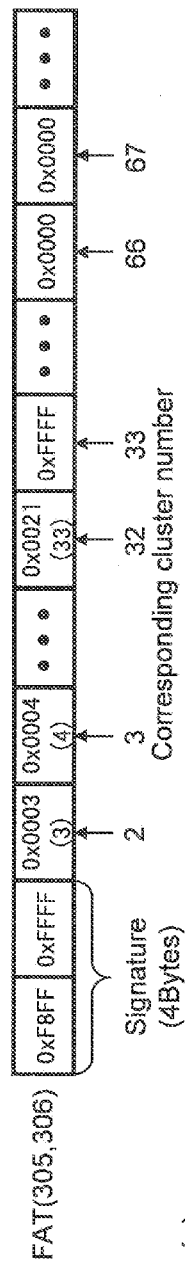
Figure 17:
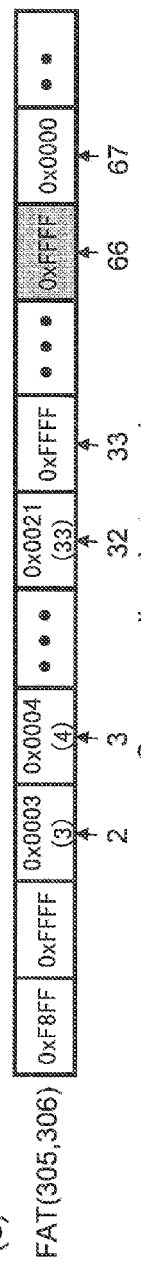
Figure 17:
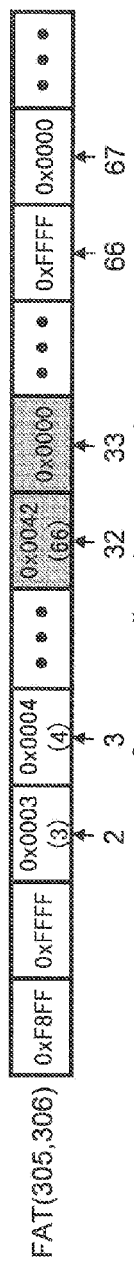

FIG. 17 is a diagram showing conditions of the FAT (305 or 306) in the case where processing for adding small-sized data is executed.

Figure 18:
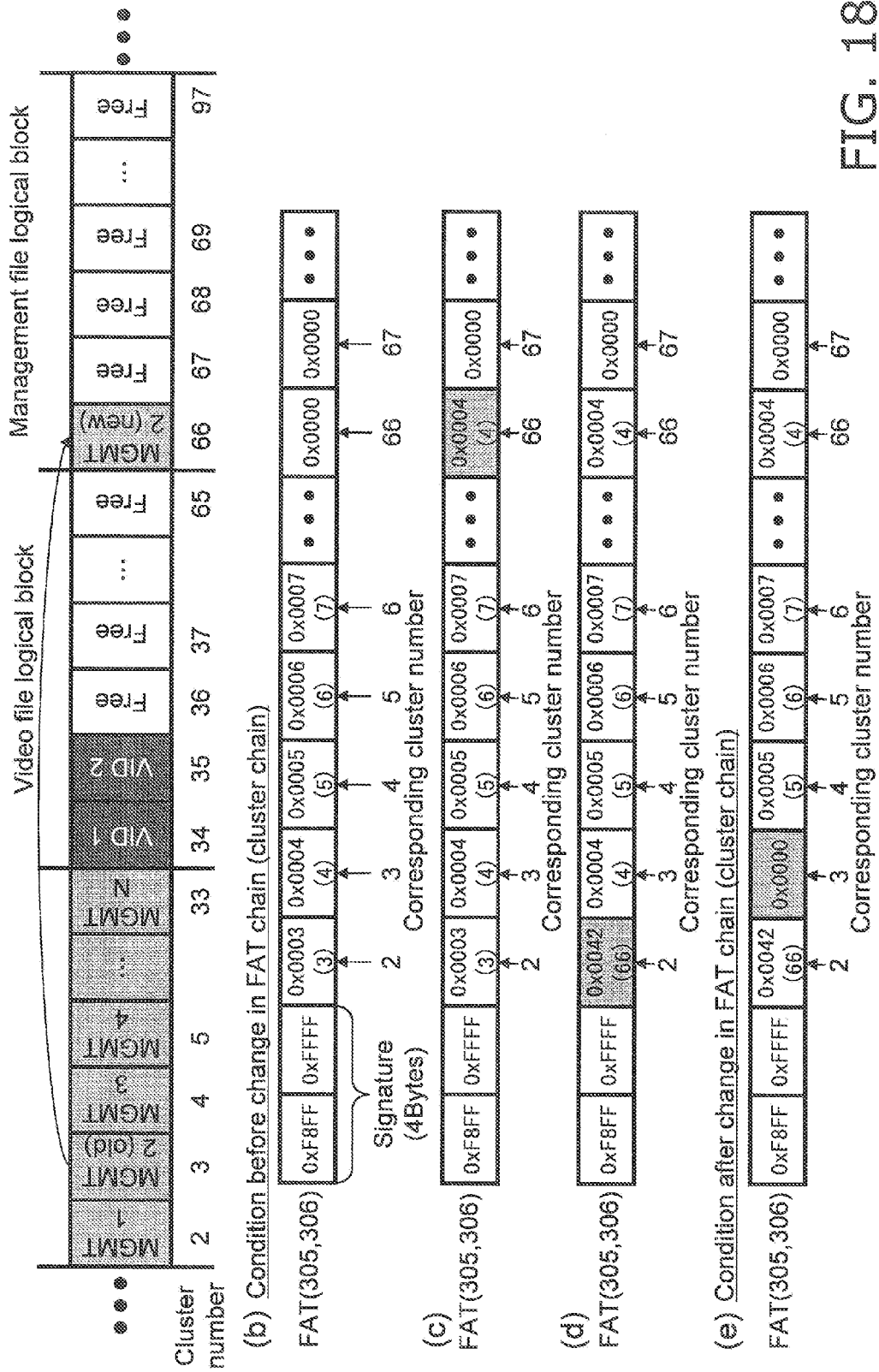
FIG. 18 is an illustrative diagram showing examples of conditions of the FAT in the case of an overwrite according to Embodiment 1.

FIG. 18 is a diagram showing conditions of the FAT (305 or 306) in the case where overwrite processing is executed.

<<Link Move Processing Procedure in Case of Addition Processing>>

First, a description will be given of the link move processing procedure in the case where addition processing is executed in the real-time information recording system 1000, with reference to FIG. 14.

(S1401):

In S1401, the link move processing unit 105 of the access module 1 sets the new data recording cluster as the link tail in the FAT (305 or 306).

In the example in FIG. 16, the case is shown in which data is added and new data is recorded to the cluster with the cluster number 66 when the cluster having the cluster number 33 is the old data recording end cluster. In this case, in the processing of S1401, 0xFFFF is set as the value of the corresponding cluster number 66 in the FAT (305 or 306) (this state corresponds to the state in (c) of FIG. 16).

(S1402):

In S1402, the old data recording end cluster is linked to the new data recording cluster in the FAT (305 or 306), and thereafter the processing is ended.

In the example of FIG. 16, the value of the corresponding cluster number 33 in the FAT (305 or 306) is changed to 0x0042 ("66" in decimal number format) (this state corresponds to the state in (d) of FIG. 16).

Although this link move processing in the case of executing addition processing is substantially the same as the normal case of adding data in a FAT file system, there is the difference that in the real-time information recording system 1000 of the present embodiment, a free cluster is allocated such that the new data recording cluster is necessarily sequentially recorded to the information recording module 2. Specifically, in processing for making an addition to a management file, new data is recorded in order from the head of the management file logical block set in the information recording module 2, and in the link move processing, the links in the FAT (305 or 306) are updated such that an addition is made to the management file (the links in the FAT (305 or 306) are updated such that the cluster added to the management file targeted for addition processing is added to the FAT chain (cluster chain)).

Note that a configuration is possible in which, in the case of adding small-sized data (e.g., several bytes of data) in the real-time information recording system 1000, addition processing and link move processing in the case of the addition processing are executed through the processing described below (the processing of S1 to S5). The following gives a description of such processing with reference to FIG. 17.

FIG. 17 shows a condition in which the cluster with the cluster number 33 in the management file logical block (the cluster "MGMT N" in FIG. 17) is the end cluster. Also, it is assumed that valid data (16 KB–M bytes) and M-byte invalid data (padding data) are recorded in the cluster with the cluster number 33 (the cluster "MGMT N" in FIG. 17). The case of recording K-byte (K<M) data in the real-time information recording system 1000 is described below.

(S1):

The file system control unit 102 reads out the valid data (16 KB–M bytes) in the cluster with the cluster number 33 (the cluster "MGMT N" in FIG. 17) to the RAM 12.

(S2):

The file system control unit 102 then creates one cluster-worth of writing data in the RAM 12 by adding K-byte addition data to the valid data (16 KB–M bytes) and adding invalid data (stuffing data) to the remaining area (an area M–K bytes in size) of the cluster.

(S3):

The access module 1 then writes the created one cluster-worth of writing data to the cluster with the cluster number 66 (the cluster at the head of the new management file logical block).

(S4):

The link move processing unit 105 then changes the value of the corresponding cluster number 66 to 0xFFFF (the value indicating the end cluster) in the FAT (305 or 306) (this state corresponds to the state of (c) in FIG. 17).

(S5):

Furthermore, the link move processing unit 105 changes the value of the corresponding cluster number 32 from 0x0021 ("33" in decimal number format) to 0x0042 ("66" in decimal number format) in the FAT (305 or 306). The link move processing unit 105 then changes the value of the corresponding cluster number 33 from 0xFFFF in the FAT (305 or 306) to 0x0000 (this state corresponds to the state of (d) in FIG. 17).

In this way, a configuration is possible in which, in the case of adding data whose size is smaller than the volume of invalid data in the last cluster in the real-time information recording system 1000, addition processing and link move processing in the case of the addition processing are executed through the processing of (S1) to (S5) above.

<<Link Move Processing Procedure in Case of Overwriting>>

Next, a description will be given of the link move processing procedure in the case where addition processing is executed in the real-time information recording system 1000, with reference to FIG. 15.

(S1501):

In S1501, the link move processing unit 105 of the access module 1 links the new data recording cluster to the link destination cluster of the old data recording cluster in the FAT (305 or 306).

In the example of FIG. 18, the case is shown in which the data in the old data recording cluster (cluster number 3) is overwritten, and new data is recorded in the cluster with the cluster number 66. In this case, in the processing of S1501, 0x0004, which is the value of the link destination cluster of the cluster number 3, is set as the value of the corresponding cluster number 66 in the FAT (305 or 306) (this state corresponds to the state of (c) in FIG. 18).

(S1502):

In S1502, the link move processing unit 105 links the link origin cluster of the old data recording cluster to the new data recording cluster in the FAT (305 or 306).

In the example of FIG. 18, the value in the FAT (305 or 306) corresponding to the cluster number 2, which is the link origin cluster of the cluster number 3, is changed to 0x0042 ("66" in decimal number format) (this state corresponds to the state of (d) in FIG. 18).

(S1503):

In S1503, the link move processing unit 105 sets the old data recording cluster as a free cluster in the FAT (305 or 306), and thereafter ends the processing.

In the example of FIG. 18, the value in the FAT (305 or 306) corresponding to the cluster number 3 is changed to 0x0000 (this state corresponds to the state of (e) in FIG. 18).

In the link move processing in the case of performing overwrite processing, a free cluster is allocated such that the new data recording cluster is necessarily sequentially recorded to the information recording module 2. Specifically, in processing for overwriting a management file, new data is recorded in order from the head of the management file logical block set in the information recording module 2, and in the link move processing, the links in the FAT (305 or 306) are updated such that the management file is overwritten (the links in the FAT (305 or 306) are updated such that the FAT chain (cluster chain) includes the overwritten cluster of the management file targeted for overwrite processing).

As has been described with reference to FIG. 14 to FIG. 18, in the real-time information recording system 1000 of the present embodiment, regardless of whether management file addition processing or management file overwrite processing is to be performed, new data is always recorded in order from the head of the management file logical block set in the information recording module 2, and through the link move processing, the links in the FAT (305 or 306) are updated such that the file is added to or overwritten (the links in the FAT (305 or 306) are updated such that the content of the addition processing or overwrite processing is reflected in the FAT chain (cluster chain)). Accordingly, in the real-time information recording system 1000, even in the recording of a management file, data is always recorded to the information recording module 2 only via sequential recording, thus enabling the management file to be recorded at high speed.

Furthermore, the case in which the writing processing size and the cluster size are both the same 16 KB has been described.

However, if the writing processing size is larger than the cluster size, addition and overwrite processing by sequential recording cannot be performed through the procedure shown in FIG. 14 to FIG. 18. In this case, addition processing and overwrite processing by sequential recording can be performed by reading out the valid cluster data that is located in the same writing processing size and is not targeted for processing, and recording the readout data to the information recording module 2 together with the new data targeted for processing.

<<Management File Overwrite Processing in Case where Writing Processing Size is 32 KB and Cluster Size is 16 KB>>

The following describes management file overwrite processing in the real-time information recording system 1000 in the case where the writing processing size is larger than the cluster size.

Figure 19:
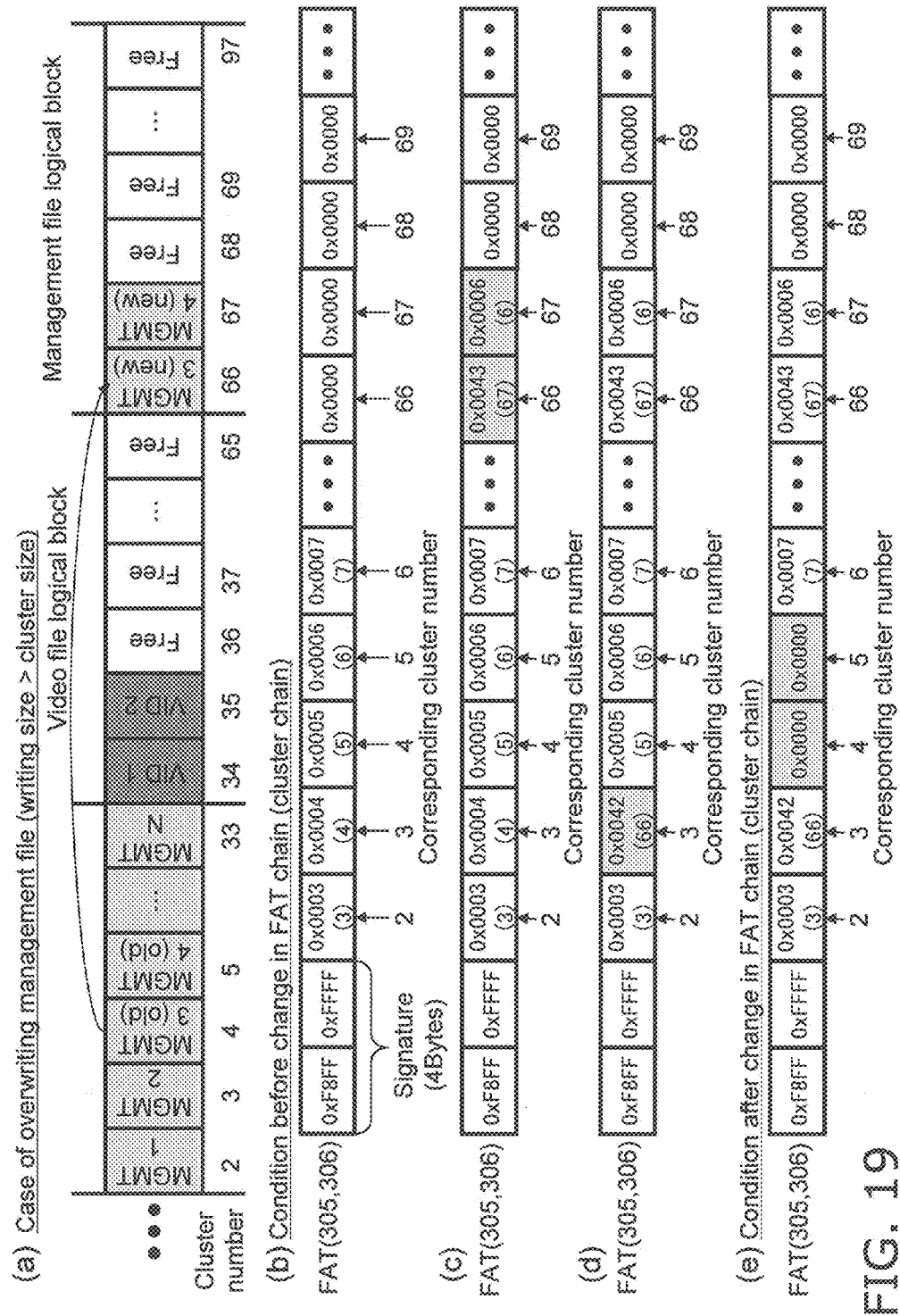
FIG. 19 is an illustrative diagram showing other examples of conditions of the FAT in the case of an overwrite according to Embodiment 1.

FIG. 19 is a diagram showing conditions of the FAT (305 or 306) at the time of management file overwrite processing in the case where the writing processing size is 32 KB and the cluster size is 16 KB. In the case of overwriting data in the cluster with the cluster number 4, according to the processing procedure shown in FIG. 14 to FIG. 18, only the new data of one cluster targeted for overwriting was recorded in the cluster with the cluster number 66. However, since the writing processing size is 32 KB, it is not possible to write only the data of the cluster targeted for overwriting. For this reason, in the real-time information recording system 1000, the data of the cluster number 5, which is included in the same writing processing unit as the cluster with the cluster number 4, is read out and written to the management file logical block together with the new data. Specifically, the new data is written to the cluster with the cluster number 66, and the data of the cluster number 5 is written to the cluster with the cluster number 67. The links in the FAT (305 or 306) are then updated such that these two clusters are contained in the file (the file targeted for overwrite processing).

In this way, in the case where the writing processing size is larger than the cluster size, in the real-time information recording system 1000, valid data before/after the cluster targeted for overwriting is read out and written to the information recording module 2 together with the data targeted for overwriting. Accordingly, in the real-time information recording system 1000, processing for writing data to the information recording module 2 is always performed by sequential recording, thus enabling the management file to be recorded to the information recording module 2 at high speed.

As described above, by combining the access module 1 and the information recording module 2 of the present embodiment, even in the case of recording a plurality of different-sized files such as a video file and a management file to the information recording module 2 in parallel, it is possible to prevent a decrease in speed due to management file recording by suppressing needless copy processing performed in the information recording module 2, thereby enabling the realization of real-time recording.

Note that although the present invention has been described based on the above embodiment, the present invention is of course not limited to the above embodiment. Modifications can be made without departing from the spirit of the present invention. The numerical values described in the present embodiment are exemplary, and other values may be used. For example, values such as the physical block size and page size are all exemplary, and are not limited to the values described in the present embodiment.

Also, although the configuration of the controller 21 of the information recording module 2 has been described using the illustration in FIG. 1, the controller 21 may have another configuration. For example, the CPU 212, the RAM 213, and the like in the controller 21 may be disposed outside the controller 21, or conversely, other constituent elements may be included in the controller 21.

Also, although FAT16 has been described as an example of the file system in the present embodiment, another file system may be used.

Also, there is no need for the number of non-volatile memories 22 used in the information recording module 2 to be one. Multiple non-volatile memories 22 may be used in combination. In particular, it is possible to further increase the speed of writing processing in the case of a configuration in which data can be written to multiple non-volatile memories 22 in parallel.

Also, although the case of writing two files, namely a video file and a management file, in parallel has been described as an example in the present embodiment, a configuration is possible in which three or more files are written in parallel. For example, by extending the configuration such that two video file temporary blocks and two management file temporary blocks are respectively managed, it is possible to write two sets of a video file and a management file in parallel. Applying this extension enables realizing, for example, simultaneous double program recording in a device such as a DVD recorder.

Also, as a temporary block in the present embodiment, although only a block that is entirely a free area is acquired and allocated as the writing target block, it is possible to perform recording with little decrease in the recording speed if a block with a large percentage of free area is used. For this reason, a block including an amount of free area greater than or equal to a predetermined threshold value may be the block targeted for allocation as the temporary block.

Also, the case of performing writing processing in cluster units has been described as an example in the present embodiment. In actual file data writing, if the writing of data whose size is smaller than the cluster size is to be performed, the present invention can be applied as follows.

(1) In the case of overwriting, old data in the same cluster is read out and merged with the new data, and the resulting data is written to the information recording module 2.

(2) In the case of an addition, data whose size is the cluster size is generated by similarly merging the new data with the old data and adding, as necessary, invalid data (padding data) such as 0x00 or 0xFF to the end of the recording area, and the generated data is written to the information recording module 2.

Also, although a method is described in the present embodiment in which the access module 1 notifies the information recording module 2 of the locations of the video file logical block and the management file logical block, and records video file data and management file data to the respective blocks, it is not necessarily necessary to provide separate blocks. Management may be performed using the same block. For example, a configuration is possible in which video file data and management file data are recording in combination with each other in a unit that is an integral multiple of the writing processing size, in order from the head of the free block that is the processing target, and when data has been recorded up to the end of the free bock, a next free block is acquired, and recording is continued in the same manner. In this case, in the addition processing and overwrite processing that are performed in the writing of the video file and the management file, links in the FAT (305 or 306) are updated through the processing procedure shown in FIG. 14 to FIG. 18. Doing this eliminates the need for the information recording module 2 to separately manage the two types of blocks, namely the video file temporary block and the management file temporary block. For this reason, in the case of executing sequential recording when using the information recording module 2 that can maintain a certain recording speed in the real-time information recording system 1000, there is no need for the access module 1 to notify, for example, the location information of the video file logical block and the management file logical block. As a result, it is possible to use a conventional information recording module 2.

Figure 20:
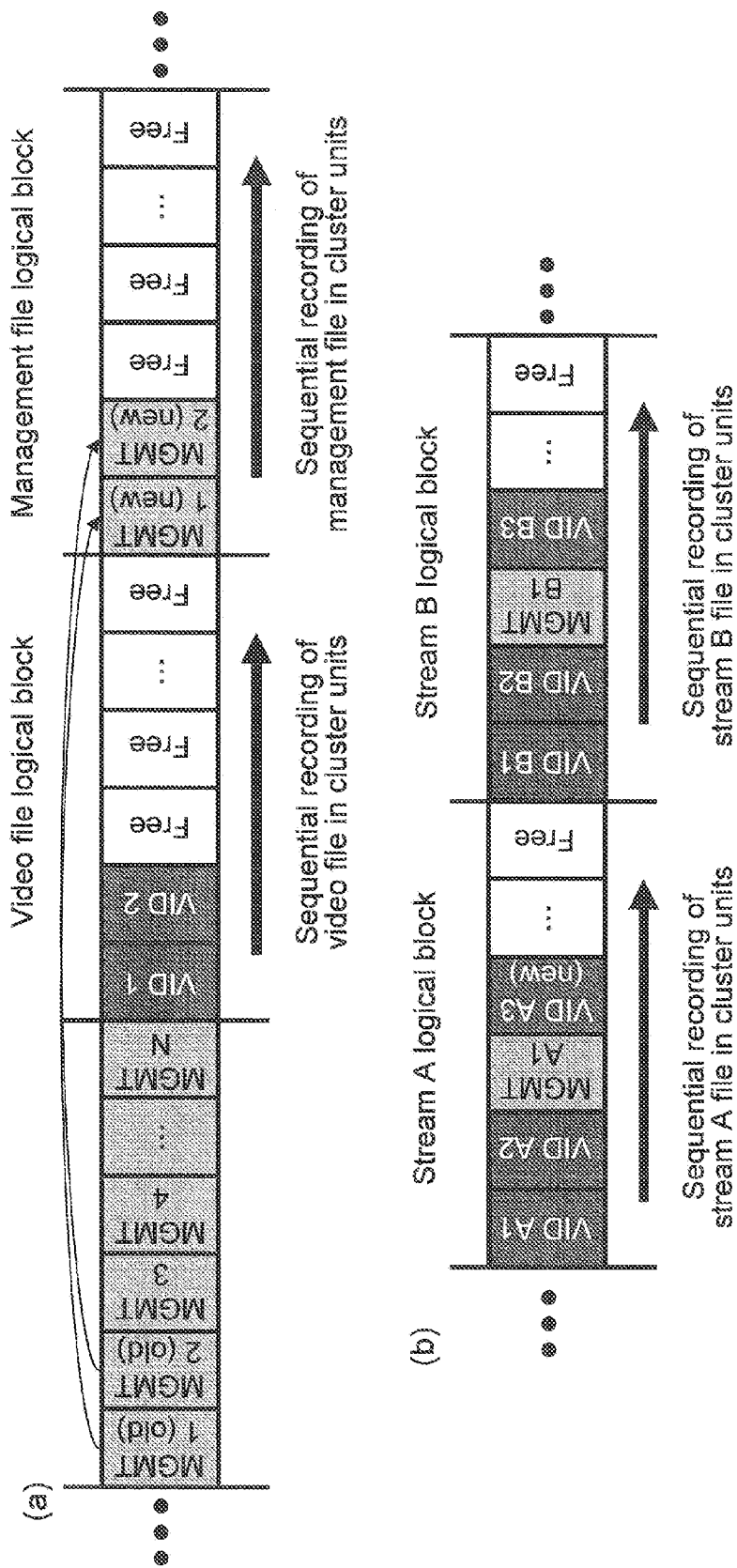
FIG. 20 is an illustrative diagram showing another example of storage destination logical addresses when writing a video file and a management file in parallel according to Embodiment 1.

Furthermore, instead of separating the video file logical block and the management file logical block in the real-time information recording system 1000, blocks may be divided for each stream that is to be recorded. Whereas (a) in FIG. 20 shows an example described in the present embodiment, a configuration is possible in which, for example, blocks are divided for each stream for which they are used, as shown in (b) of FIG. 20. The method for combining video file data and management file data in the same block is the same as that described above. In such a case of dividing blocks for each stream to be recorded, the free area that appears when a stream is deleted is grouped together, and therefore this configuration has the advantage that free blocks for re-use in subsequent data recording readily appear.

Other Embodiments

Note that the blocks in the real-time information recording system, the access module (access device), and the information recording module (information recording device) described in the above embodiments may individually be configured as a single chip by a semiconductor device such as an LSI, and a configuration is possible in which a portion or all of the blocks are configured as a single chip.

Note that the LSI described here may also be referred to as an IC, a system LSI, a super LSI, or an ultra LSI, depending on the degree of integration.

Also, the technique for integration is not limited to LSI, but instead may be realized by a dedicated circuit or a general-purpose processor. An FPGA (Field Programmable Gate Array) that is programmable after LSI manufacture or a reconfigurable processor in which the connection and settings of circuit cells in the LSI can be restructured may be used.

Furthermore, if integration technology is developed that replaces LSIs due to progressive or derivative semiconductor technology, integration of functional blocks using this technology is of course possible. For example, the application of biotechnology is a possibility.

Also, some or all of the processing of the functional blocks of the above-described embodiments may be realized by programs. The some or all of the processing of the functional blocks of the above-described embodiments are executed by a central processing unit (CPU) in a computer. Also, the programs for executing the respective processing are stored in a storage device such as a hard disk or a ROM, and are executed in the ROM or read out to a RAM and then executed.

Also, the various processing in the above embodiments may be realized by hardware, or may be realized by software (including the case of being realized together with an OS (operating system), middleware, or a predetermined library). Furthermore, such processing may be realized by a combination of software and hardware.

Also, the sequence of execution in the processing method in the above embodiments is not necessarily limited to the description of the above embodiments, and the sequence of execution can be changed without departing from the spirit of the invention.

A computer program for causing a computer to execute the above-described method and a computer-readable recording medium recording the program are encompassed in the present invention. Here, examples of the computer-readable recording medium include a flexible disk, a hard disk, a CD-ROM, an MO, a DVD, a DVD-ROM, a DVD-RAM, a BD (Blue-ray Disc), and a semiconductor memory.

The computer program is not limited to being recorded on the recording medium, and may be transmitted via, for example, an electrical communication line, a wireless or wired communication line, or a network typified by the Internet.

Note that specific configurations of the present invention are not limited to the above-described embodiments, and various modifications and corrections can be made without departing from the spirit of the invention.

INDUSTRIAL APPLICABILITY

An access module according to the present invention includes a storage address determination processing unit that determines addresses at which file data of a video file and a management file are to be stored, and a link move processing unit that sequentially records data to the information recording module regardless of whether addition or overwriting is performed in writing processing with respect to a target file, and updates links in a FAT. Also, an information recording module of the present invention includes a recording block management control unit that manages, as special areas, a block for storing a management file and a block for storing a video file in accordance with an instruction from the access module, and writes data at high speed in the case where writing was performed in units of a multiple of a predetermined writing processing size. By combining this access module and information recording module, even in the case of recording a plurality of different-sized files such as a video file and a management file to the information recording module in parallel, it is possible to prevent a decrease in speed due to management file recording by suppressing needless copy processing performed in the information recording module, thus enabling the realization of real-time recording. Such an access module is most suitable in devices that handle digital content such as music, still images, and videos, particularly in devices in which content data needs to be recorded to an information recording module in real-time, and such an access module can be used in a PC application, an audio recorder, a DVD recorder, an HDD recorder, a video camera, a digital still camera, a mobile phone terminal, and the like. Also, the information recording module of the present invention can be used as, for example, a removable medium such as a memory card for storing the above digital content and the like, or an internal recording device.

REFERENCE SIGNS LIST

1000 real-time information recording system
1 access module
2 information recording module
11, 212 CPU
12, 213 RAM
13 information recording module interface unit
14, 214 ROM
21 controller
22 non-volatile memory
101 application control unit
102 file system control unit
103 information recording module access unit
104 storage address determination processing unit
105 link move processing unit
211 access module interface unit
215 non-volatile memory interface unit
216 address management information
217 recording block management control unit
301 file system management information area
302 user data area
303 master boot record partition table
304 partition boot sector
305, 306 FAT
307 root directory entry
308 directory entry
401 video file temporary block management information
402 management file temporary block management information
403 address conversion information

The invention claimed is:

1. An access device that accesses an information recording device comprising a non-volatile memory for storing data, the access device comprising:
   a setting unit that manages a data storage area in the information recording device by dividing the data storage area in block units having a predetermined block size, and sets a first storage block for storing data of a first file and a second storage block for storing data of a second file that manages the first file; and
   a storage address determination processing unit that determines a first address that is an address for recording the first file data based on an address of the first storage block determined by the setting unit, determines a second address that is an address for recording the second file data based on an address of the second storage block determined by the setting unit, and in a case when the second file data recorded in the second storage block is to be updated or added, determines the second address such that data corresponding to an update portion or an addition portion of the second file data is recorded to an unused area in the second storage block, and an information storage module access unit that instructs the information recording device to record the first file data in accordance to the first address and instructs the information recording device to record the second file data in accordance with the second address.

2. The access device according to claim 1, wherein regardless of whether processing for writing data to the information recording device is processing for adding data to the first file or processing for overwriting data of the first file, the storage address determination processing unit sets, as a start location for writing of the first file data, a next address after a last writing location in a case where writing was performed in units whose length is a multiple of a predetermined writing size in order from a head of the first storage block, and regardless of whether processing for writing data to the information recording device is processing for adding data to the second file or processing for overwriting data of the second file, the storage address determination processing unit sets, as a start location for writing of the second file data, a next address after a last writing location in a case where writing was performed in units whose length is a multiple of the predetermined writing size in order from a head of the second storage block.

3. The access device according to claim 1, wherein the information storage module access unit instructs the information recording device to record inter-cluster link information related to file data in the first storage block and/or the second storage block.

4. The access device according to claim 1, further comprising:

a file system control unit that, in a case where writing of data whose size is less than the predetermined writing size is to be performed, performs control such that data whose length is a multiple of the predetermined writing size is generated by reading out data included in the same predetermined writing size unit and combining the readout data with new data that is to be written, and thereafter the generated data is written to the information recording device.

5. The access device according to claim 1, wherein the first file is a file storing actual content, and the second file is a file storing supplementary information of content.

6. The access device according to claim 1, wherein the predetermined writing size is a multiple of the size of a physical data recording processing unit of the non-volatile memory included in the information recording device.

7. The access device according to claim 1, wherein the predetermined block size is a multiple of the size of a physical data erasure processing unit of the non-volatile memory included in the information recording device.

8. An information recording device that is capable of being connected to an access device so as to be able to communicate with the access device, and writes and/or reads out data in accordance with an instruction from the access device, the information recording device comprising:

a non-volatile memory for storing data; and a recording block management control unit that sets a first temporary block area and a second temporary block area in the non-volatile memory, in a case where, based on address management information storing information indicating a location that is designated by the access device and is in a first storage block for storing data of a first file and information indicating a location that is designated by the access device and is in a second storage block for storing data of a second file, the fact that data is to be recorded in the first storage block has been recognized, performs control such that the data is stored in the first temporary block area in the non-volatile memory, and performs control such that, in a case where the fact that data is to be recorded in the second storage block has been recognized based on the address management information, the data is stored in the second temporary block area in the non-volatile memory.

9. The information recording device according to claim 8, wherein the recording block management control unit sets the address management information based on the information indicating a location in the first storage block and/or the second storage block that is notified in advance by the access device prior to data recording.

10. The information recording device according claim 8, wherein the recording block management control unit acquires an arbitrary free block based on notification of the information indicating a location in the first storage block and/or the second storage block by the access device, and allocates the acquired free block to the first temporary block area and/or the second temporary block area.

11. A controller that controls an information recording device comprising a non-volatile memory for storing data, the controller comprising:

a recording block management control unit that sets a first temporary block area and a second temporary block area in the non-volatile memory, references address management information storing information indicating a location that is designated by an external access device and is in a first storage block for storing data of a first file and information indicating a location that is designated by the access device and is in a second storage block for storing data of a second file, performs control such that, in a case where the fact that data is to be recorded in the first storage block has been recognized, the data is stored in the first temporary block area in the non-volatile memory, and performs control such that, in a case where the fact that data is to be recorded in the second storage block has been recognized, the data is stored in the second temporary block area in the non-volatile memory.

12. A real-time information recording system comprising:

the access device according to claim 1; and an information recording device that is capable of being connected to an access device so as to be able to communicate with the access device, and writes and/or reads out data in accordance with an instruction from the access device, the information recording device comprising:

a non-volatile memory for storing data; and a recording block management control unit that sets a first temporary block area and a second temporary block area in the non-volatile memory, in a case where, based on address management information storing information indicating a location that is designated by the access device and is in a first storage block for storing data of a first file and information indicating a location that is designated by the access device and is in a second storage block for storing data of a second file, the fact that data is to be recorded in the first storage block has been recognized, performs control such that the data is stored in the first temporary block area in the non-volatile memory, and performs control such that, in a case where the fact that data is to be recorded in the second storage block has been recognized based on the address management information, the data is stored in the second temporary block area in the non-volatile memory.

13. An access method to a memory for use in an access device that accesses an information recording device comprising a non-volatile memory for storing data, the memory access method comprising:

a storage address determination processing step of
managing a data storage area in the information recording device by dividing the data storage area in block units having a predetermined block size, and setting a first storage block for storing data of a first file and a second storage block for storing data of a second file that manages the first file, determining an address for recording the first file data in order in the first storage block, in ascending order from a first address in the first storage block, and in a case where the second file data corresponding to the first file data recorded in the first storage block is to be updated or added, determining an address for recording cluster data to an unused cluster area having a lowest address in the second storage block, the cluster data corresponding to an update portion or an addition portion of the second file data;

a link move processing step of updating inter-cluster link information related to the second file data based on the data update or the data addition in the second storage block; and an information storage module access step of instructing the information recording device to record the first file data and the second file data in accordance with a result of processing in the storage address determination processing step and the link move processing step.

14. A non-transitory computer-readable storage medium storing a program for causing a computer to execute a memory access method for use in an access device that accesses an information recording device comprising a non-volatile memory for storing data, the memory access method comprising:

a storage address determination processing step of
managing a data storage area in the information recording device by dividing the data storage area in block units having a predetermined block size, and setting a first storage block for storing data of a first file and a second storage block for storing data of a second file that manages the first file, determining an address for recording the first file data in order in the first storage block, in ascending order from a first address in the first storage block, and in a case where the second file data corresponding to the first file data recorded in the first storage block is to be updated or added, determining an address for recording cluster data to an unused cluster area having a lowest address in the second storage block, the cluster data corresponding to an update portion or an addition portion of the second file data;

a link move processing step of updating inter-cluster link information related to the second file data based on the data update or the data addition in the second storage block; and an information storage module access step of instructing the information recording device to record the first file data and the second file data in accordance with a result of processing in the storage address determination processing step and the link move processing step.

15. The access device according to claim 1, wherein the storage address determination processing unit determines the second address such that the data corresponding to an update portion or an addition portion of the second file data is recorded to an used area in the second storage block in the order from an unused area having a lowest address to an unused area having a higher address.

16. The access device according to claim 1, wherein the storage address determination processing unit determines the first address such that the first file data is recorded in the first storage block, in ascending order from a first address in the first storage block.

17. The access device according to claim 1 further comprising
a link move processing unit that updates link information related to the second file data recorded to the second storage block based on the data update or the data addition in the second storage block.

* * * * *